US006809777B2

(12) United States Patent
Oka et al.

(10) Patent No.: US 6,809,777 B2
(45) Date of Patent: Oct. 26, 2004

(54) PIXEL CALCULATING DEVICE

(75) Inventors: Hiroyuki Oka, Neyagawa (JP); Hideshi Nishida, Nishinomiya (JP); Kosuke Yoshioka, Neyagawa (JP); Tokuzo Kiyohara, Osaka (JP); Makoto Hirai, Suita (JP); Kozo Kimura, Osaka (JP); Ryuji Matsuura, Neyagawa (JP); Hiroyuki Morishita, Hirakata (JP); Toshiaki Tsuji, Kobe (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 510 days.

(21) Appl. No.: 10/019,419

(22) PCT Filed: Apr. 23, 2001

(86) PCT No.: PCT/IB01/00665

§ 371 (c)(1),
(2), (4) Date: Dec. 18, 2001

(87) PCT Pub. No.: WO01/82227

PCT Pub. Date: Nov. 1, 2001

(65) Prior Publication Data

US 2002/0106136 A1 Aug. 8, 2002

(30) Foreign Application Priority Data

Apr. 21, 2000 (JP) ........................................ 2000-120753
Apr. 21, 2000 (JP) ........................................ 2000-120754

(51) Int. Cl.[7] .............................. H04N 9/64; H04N 9/74
(52) U.S. Cl. ...................... 348/571; 348/721; 348/581; 708/300
(58) Field of Search ................................. 348/581, 571, 348/575, 569, 720, 721, 441; 708/300, 301, 303, 313; 345/502, 505, 506; H04N 9/64, 9/74

(56) References Cited

U.S. PATENT DOCUMENTS

| 4,802,111 A | * | 1/1989 | Barkan et al. ............... 708/313 |
| 5,227,863 A | * | 7/1993 | Bilbrey et al. ............... 348/578 |
| 5,315,700 A | * | 5/1994 | Johnston et al. ............ 345/502 |
| 5,528,301 A | * | 6/1996 | Hau et al. .................... 348/441 |
| 5,587,742 A | * | 12/1996 | Hau et al. .................... 348/441 |
| 5,600,582 A | * | 2/1997 | Miyaguchi ................... 708/300 |
| 5,864,636 A | * | 1/1999 | Chisaka ....................... 382/189 |
| 6,154,761 A | * | 11/2000 | Kondo et al. ................ 708/300 |
| 6,681,059 B1 | * | 1/2004 | Thompson ................... 382/298 |

FOREIGN PATENT DOCUMENTS

| CA | 2246536 | 8/1998 |
| JP | 548388 | 2/1993 |
| WO | WO98/29832 | 7/1998 |

* cited by examiner

Primary Examiner—Michael H. Lee

(57) ABSTRACT

A pixel calculating device for performing vertical filtering that includes 16 pixel processing units 1 to 16 and an input buffer group 22 storing 16 pieces of pixel data and filter coefficients. Each of the pixel processing units performs operations using the pixel data and a filter coefficient supplied from input buffer group 22, and then acquires pixel data from an adjacent pixel processing unit. Further operations are performed by each of the pixel processing units using the acquired pixel data and operation results are accumulated. Filtering is carried out through a repetition of this acquiring and accumulation process, the number of taps being determined by the number of repetitions.

5 Claims, 34 Drawing Sheets

Fig.8

Filtering: Initial Input Values

| | Pixel Transmission Unit7 | Pixel Processing Unit1 | | | | Pixel Processing Unit2 | | | | ... | ... | ... | Pixel Processing Unit16 | | | | Pixel Transmission Unit18 |
|---|---|---|---|---|---|---|---|---|---|---|---|---|---|---|---|---|---|
| Input Port | A — H | A | B | C | | A | B | C | | | | | A | B | C | | H — A |
| Input Pixel | X1 — X8 | X9 | X9 | a0/2 | | X10 | X10 | a0/2 | | | | | X24 | X24 | a0/2 | | X25 — X32 | note: X1~X32 form one line of 32 consecutive pixels; a0 is a filter coefficient

Fig.10

Filtering: Operation Process (Pixel Processing Unit 1)

| CLK | Delayer | | | | Adder | Tap Number |
|---|---|---|---|---|---|---|
| | A | B | C | D | B Output | |
| 1 | X9 | X9 | a0/2 | 0 | | |
| 2 | X10 | X8 | a1 | a0*X9 | a0*X9 | 1 |
| 3 | X11 | X7 | a2 | a0*X9+a1(X11+X8) | a0*X9+a1(X10+X8) | 3 |
| 4 | X12 | X6 | a3 | a0*X9+···+a2(X12+X7) | a0*X9+a1(X10+X8)+a2(X11+X7) | 5 |
| 5 | X13 | X5 | a4 | a0*X9+···+a3(X13+X6) | a0*X9+a1(X10+X8)+···+a3(X12+X6) | 7 |
| 6 | X14 | X4 | a5 | a0*X9+···+a4(X14+X5) | a0*X9+a1(X10+X8)+···+a4(X13+X5) | 9 |
| 7 | X15 | X3 | a6 | a0*X9+···+a5(X15+X4) | a0*X9+a1(X10+X8)+···+a5(X14+X4) | 11 |
| 8 | X16 | X2 | a7 | a0*X9+···+a6(X16+X3) | a0*X9+a1(X10+X8)+···+a6(X15+X3) | 13 |
| 9 | X17 | X1 | a8 | a0*X9+···+a7(X17+X2) | a0*X9+a1(X10+X8)+···+a7(X16+X2) | 15 |
| | | | | | a0*X9+a1(X10+X8)+···+a8(X17+X1) | 17 | note: a1~a7 are filter coefficients; tap number is 3 if filtering completed in CLK2; tap numbers from CLK3 on are as shown

Fig.12

MC Processing: I/O Values (P Picture)

|  | Pixel Transmission Unit17 | Pixel Processing Unit1 | Pixel Processing Unit2 | ... | Pixel Processing Unit16 | Pixel Transmission Unit18 |
|---|---|---|---|---|---|---|
| Input Port | A~H | A B C | A B C | ... | A B C | H~A |
| Input Pixel | *~* | P1 D1 1 | P2 D2 1 | ... | P16 D16 1 | *~* |
| Output Port |  | D(AdderB) | D(AdderB) | ... | D(AdderB) |  |
| Output Pixel |  | P1+D1 | P2+D2 | ... | P16+D16 |  | note: "*" denotes input value irrelevant; P1~P16 are 16 pixels in a reference frame; D1~D16 are 16 difference values

Fig.14

MC Processing: I/O Values (B Picture)

| | Pixel Transmission Unit17 | Pixel Processing Unit1 | Pixel Processing Unit2 | ... | Pixel Processing Unit16 | Pixel Transmission Unit18 |
|---|---|---|---|---|---|---|
| Input Port | A→H | A  B  C | A  B  C | ... | A  B  C | H→A |
| Input PixelCLK1 | *→* | P1  B1  1/2 | P2  B2  1/2 | ... | P16  B16  1/2 | *→* |
| Input PixelCLK2 | *→* | 1  0  D1 | 1  0  D2 | ... | 1  0  D16 | *→* |
| Output Port | | D(AdderB) | D(AdderB) | ... | D(AdderB) | |
| Output Pixel | | (P1+B1)/2+D1 | (P2+B2)/2+D2 | ... | (P16+B16)/2+D16 | | note: "*" denotes input value irrelevant; P1～P16 are 16 pixels in a reference frame;
B1～B16 are also 16 pixels in a reference frame

Fig.15

OSD Processing: I/O Values

| | Pixel Transmission Unit17 | Pixel Processing Unit1 | Pixel Processing Unit2 | ... | Pixel Processing Unit16 | Pixel Transmission Unit18 |
|---|---|---|---|---|---|---|
| Input Port | A–H | A B C | A B C | ... | A B C | H–A |
| Input Pixel | *–* | X1 0 1 | X2 0 1 | ... | X16 0 1 | *–* |
| Output Port | | D(AdderB) | D(AdderB) | ... | D(AdderB) | |
| Output Pixel | | X1 | X2 | ... | X16 | | note: X1~X16 are 16 consecutive pixels in an OSD image

Fig.17

ME Processing: I/O Values

| | Pixel Transmission Unit17 | Pixel Processing Unit1 | Pixel Processing Unit2 | ... | Pixel Processing Unit16 | Pixel Transmission Unit18 |
|---|---|---|---|---|---|---|
| Input Port | A–H | A B C | A B C | ... | A B C | H–A |
| Input Pixel(16times) | *–* | X1 R1 1 | X2 R2 1 | ... | X16 R16 1 | *–* |
| Output Port | | D(AdderB) | D(AdderB) | ... | D(AdderB) | |
| Output Pixel | | Σ \| X1-R1 \| | Σ \| X2-R2 \| | ... | Σ \| X16-R16 \| | | note: X1~X16 are 16 consecutive pixels in a macroblock to be encoded

Fig.18
R1−R16
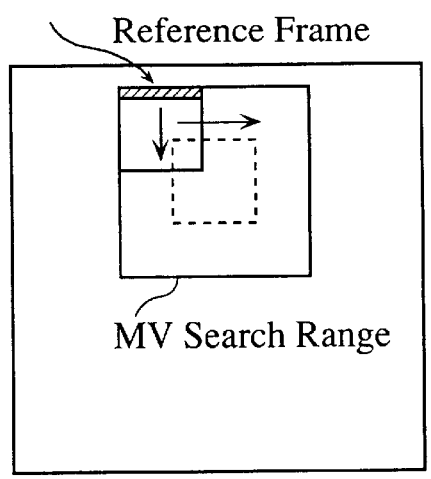
Reference Frame
MV Search Range
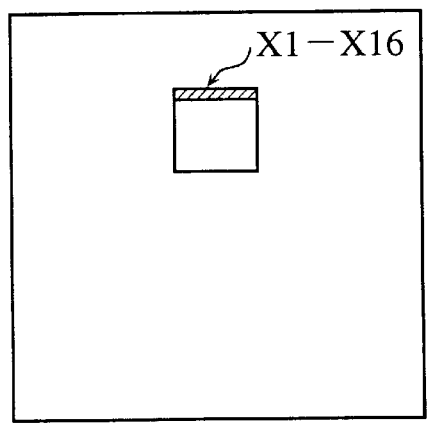
Encoding Target Frame
X1−X16

PIXEL CALCULATING DEVICE

TECHNICAL FIELD

The present invention relates to a pixel calculating device that has a filtering circuit for resizing images.

BACKGROUND ART

In recent years, remarkable technical developments have been made in relation to digital imaging equipment, and now available on the market are media processors capable, for example, of compressing, decompressing, and resizing moving images. In image resizing, finite impulse response (FIR) filters are commonly used.

FIG. 1 is a block diagram showing an exemplary prior art FIR filtering circuit. The FIR filter shown in FIG. 1 has seven taps and symmetrical coefficients. In this circuit, data inputted in time series from data input terminal 1001 is sent sequentially to delayers 1002, 1003, 1004, 1005, 1006, and 1007.

When the filter coefficients are symmetrical, tap pairings having the same coefficient value are pre-summed and then multiplied by the shared coefficient, rather than multiplying each tap individually by the coefficient. The filter coefficients are said to be in symmetry when the coefficients corresponding the input and output (i.e. "taps") from data input terminal 1001 and the delayers 1002 to 1007, respectively, are symmetrical around the center tap (i.e. the output of delayer 1004).

In the prior art FIR filter, for example, the input of data input unit 1001 and the output of delayer 1007 are summed in adder 1008 and the result is multiplied by coefficient h0 in multiplier 1008. Likewise, the output from delayers 1002 and 1006 are summed in adder 1009 and the result is multiplied by coefficient h1 in multiplier 1009. The output from multipliers 1011 to 1014 is then summed in adder 1015 and the result of the filtering is outputted in time-series from data output terminal 1016.

The value of coefficients h0 to h3 is determined by the rate of image downscaling. If the downscaling rate is ½ the output from adders 1008~1010 is decimated by ½ to obtain the downscaled image.

Symmetrical filter coefficients are preferred because of the favorable image quality resulting from the linear phase (i.e. the phase being linear with respect to frequency).

However, with the above prior art method, the configuration of the circuit dictates that the pixel data comprising the image are inputted sequentially from left to right, thus allowing only one pixel to be inputted per clock cycle. Improvements in circuitry processing speeds can be accomplished by increases in operating frequency, although increasing the operating frequency adversely leads to increases in cost and power consumption.

Furthermore, the prior art method lacks flexibility because it requires a different circuit depending on the number of taps. Substantial costs are also involved in providing a different circuit for variations in the number of taps.

Thus a first objective of the present invention is to provide a pixel calculating device capable of conducting high-speed filtering without necessarily increasing the operating frequency, and which allows for variations in the number of taps.

A second objective of the present invention is to provide a pixel calculating device capable of conducting not only filtering but also motion compensation (MC) processing, and which allows for the circuitry to be reduced in size.

A third objective of the present invention is to provide a pixel calculating device capable of conducting not only filtering but also motion estimation (ME) processing, and which allows for the circuitry to be reduced in size.

A fourth objective of the present invention is to provide a pixel calculating device capable of conducting not only filtering but also on-screen display (OSD) processing, and which allows for the circuitry to be reduced in size.

DISCLOSURE OF INVENTION

The pixel calculating device provided to achieve the first objective conducts filtering and includes N number of pixel processing units, a supply unit for supplying N pieces of pixel data and filter coefficients, and a control unit for controlling the N pixel processing units in parallel. Each of the pixel processing units performs operations using the pixel data and filter coefficient supplied from the supply unit, and then acquires pixel data from an adjacent pixel processing unit, performs further operations using the acquired pixel data, and accumulates operation results. The control unit controls each of the pixel processing units to repeat the operations of acquiring the pixel data from the adjacent pixel processing unit, performing operations using the acquired pixel data, and accumulating the operation results. Furthermore, the N pixel processing units form a first shifter that shifts N pieces of pixel data to the right, and a second shifter that shifts N pieces of pixel data to the left. Also, each of the pixel processing units performs the operations using two pieces of pixel data shifted from two adjacent pixel processing units.

According to this structure, high-speed filtering can be conducted without necessarily increasing the operating frequency, and the number of taps is variable.

The pixel calculating device provided to achieve the second objective includes a supply unit that supplies pixel data of a differential image and pixel data of a reference frame.

According to this structure, the device is capable of conducting not only filtering but also motion compensation (MC) processing, and does not required the filtering device and the MC circuit to be provided separately. This structure therefore allows for the circuitry to be reduced in size.

BRIEF DESCRIPTION OF DRAWINGS

FIG. 6(*b*) is a block diagram showing in detail a structure of a selection unit within input buffer group 22;

FIG. 8 shows initial input values when filtering is performed in the pixel operation unit;

FIG. 10 shows operations performed in a pixel processing unit as part of the filtering;

FIG. 12 shows input/output values when motion compensation (MC) processing of a P picture is performed in the pixel operation unit;

FIG. 14 shows input/output values when MC processing of a B picture is performed in the pixel operation unit;

FIG. 15 shows input/output values when on-screen display (OSD) processing is performed in the pixel operation unit;

FIG. 17 shows input/output values of pixel data when motion estimation (ME) processing is performed in the pixel operation unit;

FIG. 18 shows in detail a decoding target frame and a reference frame utilized in ME processing;

BEST MODE FOR CARRYING OUT THE INVENTION

The pixel calculating device, or pixel operation unit as it is otherwise known, of the present invention selectively performs (a) filtering for scaling (i.e. upscaling/downscaling) an image, (b) motion compensation, (c) on-screen display (OSD) processing, and (d) motion estimation.

In the filtering, the number of taps is variable, and the pixel calculating device sequentially processes a plurality of pixels (e.g. 16 pixels) that are consecutive in both the horizontal and vertical directions. The vertical filtering is performed simultaneous to the decompression of the compressed moving image data.

The pixel calculating device according to the embodiment of the present invention will be described in the following order:

1 Structure of the Media Processor
1.1 Structure of the Pixel Calculating Device
1.2 Structure of the Pixel Parallel-Processing Unit
2.1 Filtering
2.2 Motion Compensation
2.3 OSD Processing
2.4 Motion Estimation
3.1 Vertical Filtering (1)
3.1.1 ½ Reduction
3.1.2 ¼ Reduction
3.2 Vertical Filtering (2)
3.2.1 ½ Reduction
3.2.2 ¼ Reduction
4 Variations 1 Structure of the Media Processor The following description relates to a pixel calculating device included within a media processor that performs media processing (i.e. compression of audio/moving image data, decompression of compressed audio/moving image data, etc). The media processor can be mounted in a set top box that receives digital television broadcasts, a television receiver, a DVD player, or a similar apparatus.

Figure 1:
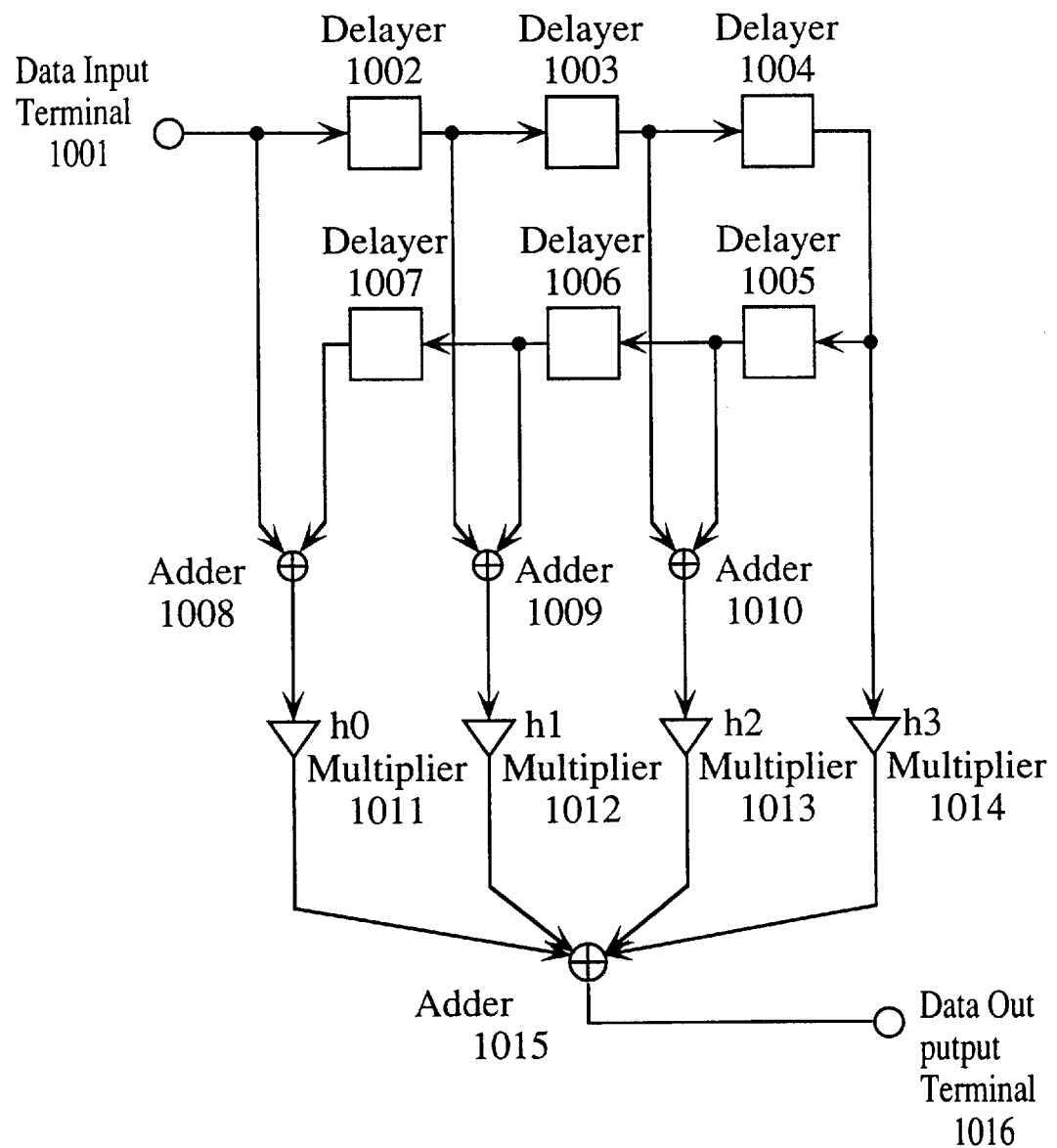
FIG. 1 is a block diagram showing an exemplary prior art circuit for performing FIR filtering.
Figure 2:
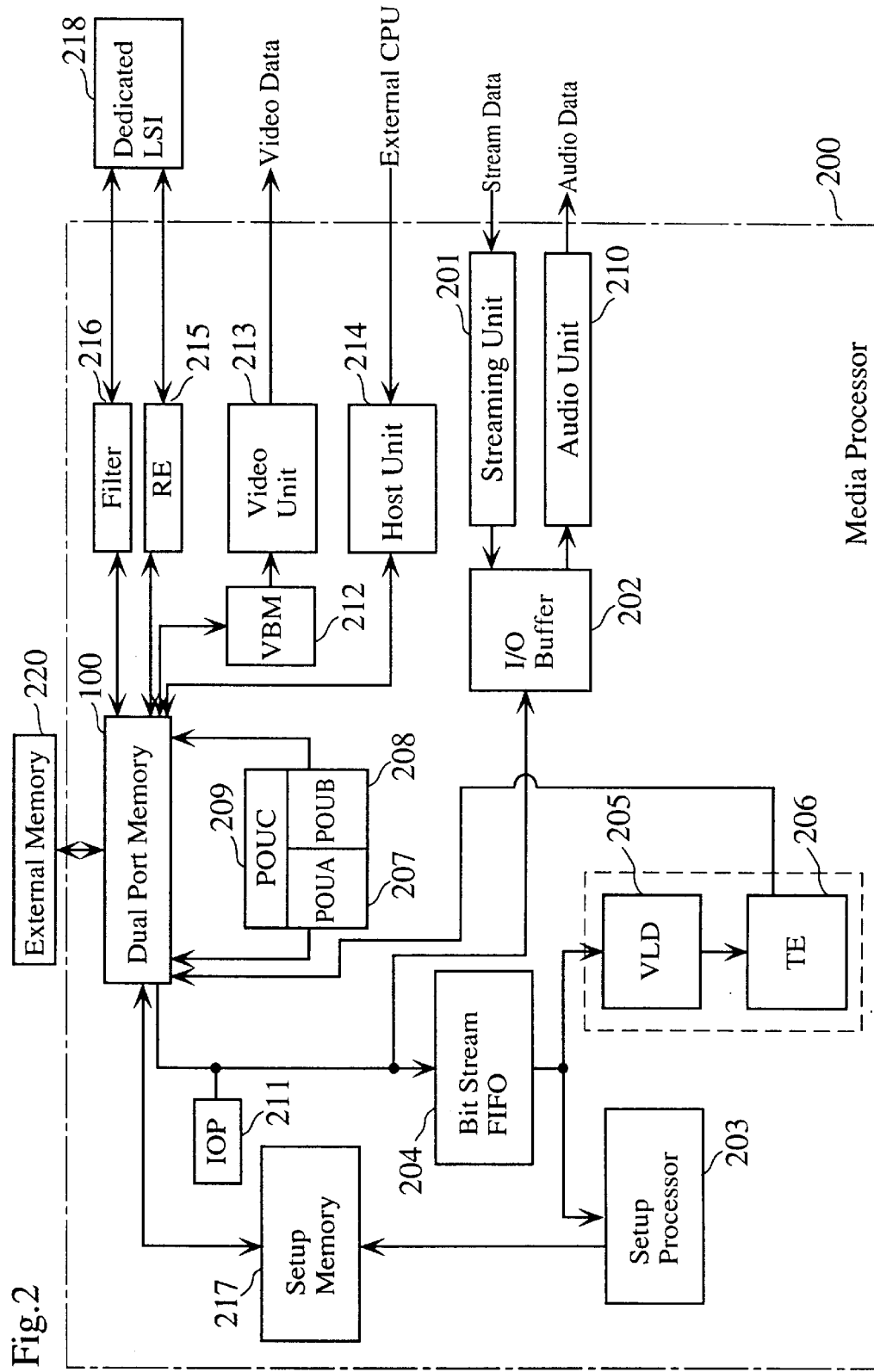
FIG. 2 is a block diagram showing a structure of a media processor that includes a pixel operation unit (POUA and POUB)

FIG. 2 is a block diagram showing a structure of the media processor that includes the pixel calculating device. In FIG. 2, media processor 200 has a dual port memory 100, a streaming unit 201, an input/output buffer (I/O buffer) 202, a setup processor 203, a bit stream first-in first-out memory device (FIFO) 204, a variable-length decoder (VLD) 205, a transfer engine (TE) 206, a pixel operation unit (i.e. pixel calculating device) A (POUA) 207, a POUB 208, a POUC 209, an audio unit 210, an input/output processor (IOP) 211, a video buffer memory (VBM) 212, a video unit 213, a host unit 214, an RE 215, and a filter 216.

Dual port memory 100 includes an I/O port (external port) connected to an external memory 220, an I/O port (internal port) connected to media processor 200, and a cache memory. Dual port memory 100 receives, via the internal port, an access request from the structural element (master device) of media processor 200 that writes data into and reads data out of external memory 220, accesses external memory 220 as per the request, and stores part of the data of external memory 220 in the cache memory. External memory 220 is SDRAM, RDRAM, or a similar type of memory, and temporarily stores data such as compressed audio/moving image data and decoded audio/moving image data.

Streaming unit 201 inputs stream data (an MPEG stream) from an external source, sorts the inputted steam data into a video elementary stream and an audio elementary stream, and write each of these streams into I/O buffer 202.

I/O buffer 202 temporarily stores the video elementary stream, the audio elementary stream, and audio data (i.e. decompressed audio elementary stream). The video elementary stream and the audio elementary stream are sent from streaming unit 201 to I/O buffer 202. Under the control of IOP 211, the video elementary stream and the audio elementary stream are then sent from I/O buffer 202 to external memory 220 via dual port memory 100. The audio data is sent, under the control of IOP 211, from external memory 220 to I/O buffer 202 via dual port memory 100.

Setup processor 203 decodes (i.e. decompresses) the audio elementary stream and analyses the macroblock header of the video elementary stream. Under the control of IOP 211, the audio elementary stream and the video elementary stream are sent from external memory 220 to bit stream FIFO 204 via dual port memory 100. Setup processor 203 reads the audio elementary stream from bit stream FIFO 204, decodes the read audio elementary stream, and stores the decoded audio elementary stream (i.e. audio data) in setup memory 217. Under the control of IOP 211, the audio data stored in setup memory 217 is sent to external memory 220 via dual port memory 100. Setup processor 203 also reads the video elementary stream from bit stream FIFO 204, analyses the macroblock header of the read video elementary stream, and notifies VLD 205 of the result of the analysis.

Bit stream FIFO 204 supplies the audio elementary stream to setup processor 203 and the video elementary stream to VLD 205. The audio elementary stream and the video elementary stream are sent, under the control of IOP 211, from external memory 220 to bit stream FIFO 204 via dual port memory 100.

VLD 205 decodes the variable-length encoded data included in the video elementary stream supplied from bit stream FIFO 204. The decoding results in groups of discrete cosine transform (DCT) coefficients that represent macroblocks.

TE 206 performs inverse quantization (IQ) and inverse discrete cosine transform (IDCT) per macroblock unit on the groups of DCT coefficients outputted from the decoding performed by VLD 205. The processes performed by TE 206 results in the formation of macroblocks of pixel data.

One macroblock is composed of four luminance blocks (Y1~Y4) and two chrominance blocks (Cb, Cr), each block consisting of an 8×8 array of pixels. In relation to P picture and B picture, however, TE 206 outputs not pixel data but an 8×8 arrays of differential values. The output of TE 206 is stored in external memory 220 via dual port memory 100.

POUA 207 selectively performs (a) filtering, (b) motion compensation, (c) OSD processing, and (d) motion estimation.

In the filtering, POUA 207 sequentially filters, 16 pixels at a time, the pixel data included in the decoded video elementary stream (i.e. video data or frame data) stored in external memory 220, and downscales or upscales the frame data by decimating or interpolating the filtered pixels, respectively. Under the control of POUC 209, the scaled frame data is then stored to external memory 220 via dual port memory 100.

In the motion compensation, POUA 207 sequentially sums, 16 pixel at a time, the pixels in a reference frame and the differential values for P picture and B picture outputted from TE 206. Under the control of POUC 209, the 16 respective pairings of pixels and differential values are then inputted into POUA 207 in accordance with a motion vector extracted from the macroblock header analysis performed by setup processor 203.

In the OSD processing, POUA 207 inputs, via dual port memory 100, an OSD image (still image) from external memory 220, and then overwrites the display frame data stored in external memory 220 with the output of the OSD processing. An OSD image here refer to images displayed in response to a remote control operation by a user, such as menus, time schedule displays, and television channel displays.

In the motion estimation, a motion vector is determined by examining a reference frame so as to identify a rectangular area exhibiting the highest degree of correlation with a macroblock in a piece of frame data to be encoded. POUA 207 sequentially calculates, 16 pixels at a time, the differential values existing between the pixels in the macroblock to be encoded and the respective pixels in the highly correlated rectangular area of the reference frame.

POUB 208 is configured identically to POUA 207, and shares the load of the above processing (a) to (d) with POUA 207.

POUC 209 controls both the supply of pixel data from external memory 220 to POUA 207 and POUB 208 and the transmission of the processing output from POUA 207 and POUB 208 back to external memory 220.

IOP 211 controls the data input/output (data transmission) within media processor 200. The data transmission performed within media processor 200 is as follows: first, stream data stored in I/O buffer 202 is sent via dual port memory 100 to the stream buffer area within external memory 220; second, the audio and video elementary streams stored in external memory 220 are sent via dual port memory 100 to bit stream FIFO 204; third, audio data stored in external memory 220 is transmitted via dual port memory 100 to I/O buffer 202.

Video unit 213 reads two to three lines of pixel data from the frame data stored in external memory 220, stores the read pixel data in VBM 212, converts the stored pixel data into image signals, and outputs the image signals to an externally connected display apparatus such as a television receiver.

Host unit 214 controls the commencement/termination of MPEG encoding and decoding, OSD processing, and image scaling, etc, in accordance with an instruction received from an external host computer.

Rendering engine 215 is a master device that performs rendering on computer graphics. When a dedicated LSI 218 is externally connected to media processor 200, rendering engine 215 conducts data input/output with dedicated LSI 218.

Filter 216 scales still image data. When dedicated LSI 218 is externally connected to media processor 200, filter 216 conducts data input/output with dedicated LSI 218.

Media processor 200 has been described above in terms of the decoding (decompression) of stream data inputted from streaming unit 201. Encoding (compression) of video and audio data involves a reversal of this decoding process. In other words, with respect to both audio and video data, POUA 207 (or POUB 208) performs motion estimation, TE 206 performs discrete cosine transform and quantization, and VLD 205 performs variable-length encoding on the audio and video data to be compressed.

1.1 Structure of the Pixel Operation Unit

Figure 3:
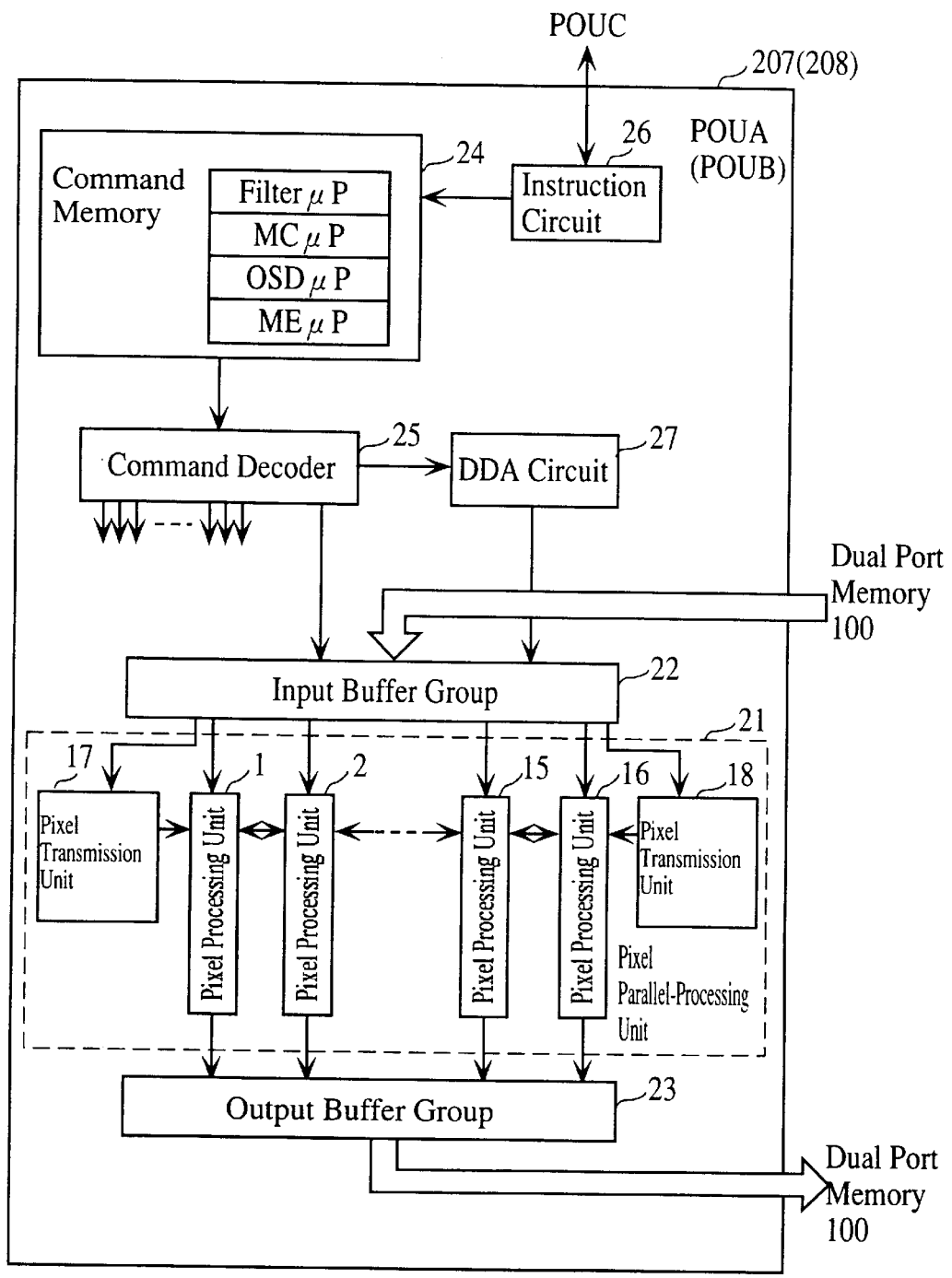
FIG. 3 is a block diagram showing a structure of the pixel operation unit (either POUA or POUB)

FIG. 3 is a block diagram showing a structure of the pixel operation unit. Since POUA 207 and POUB 208 are identical in structure, the description given below will only refer to POUA 207.

As shown in FIG. 3, POUA 207 includes a pixel parallel-processing unit 21, an input buffer group 22, an output buffer group 23, a command memory 24, a command decoder 25, an instruction circuit 26, and a digital differential analyzing (DDA) circuit 27.

Pixel parallel-processing unit 21 includes pixel transmission units 17 and 18, and pixel processing units 1 to 16. Pixel parallel-processing unit 21 selectively performs the (a) filtering, (b) motion compensation, (c) OSD processing and (d) motion estimation, as described above, on a plurality of pixels inputted from input buffer group 22, and outputs the result to output buffer group 23. Each of (a) to (d) processing is performed per macroblock unit, which requires each of the processing to be repeated sixteen times in order to process the 16 lines of 16 pixels. POUC 209 controls the activation of each of the processing.

In the filtering, pixel transmission unit 17 stores a plurality of 16 input pixels (eight in the given example), being the pixels on the far left (or above), and shifts the stored pixels one position to the right per clock cycle. Conversely, pixel transmission unit 18 stores a plurality of 16 input pixels (eight in the given example), being the pixels on the far right (or below), and shifts the stored pixels one position to the left per clock cycle.

Input buffer group 22 stores the plurality of pixels to be processed, these pixels having been sent, under the control of POUC 209, from external memory 220 via dual port memory 100. Input buffer group 22 also stores the filter coefficients used in the filtering.

Output buffer group 23 changes the ordering of the processing results outputted from pixel parallel-processing unit 21 (i.e. 16 processing results representing the 16 input pixels) as necessary, and temporarily stores the reordered processing results. This reordering process is conducted as a means of either decimating (downscaling) or interpolating (upscaling) the frame data.

Command memory 24 stores a filtering microprogram (filter $\mu$P), a motion compensation microprogram (MC $\mu$P), an OSD processing microprogram (OSD $\mu$P), and a motion estimation microprogram (ME $\mu$P). Command memory 24 also stores a macroblock format conversion microprogram and a pixel value range conversion microprogram.

The format of a macroblock here refers to the sampling rate ratio of luminance (Y) blocks to chrominance (Cb, Cr) blocks per macroblock unit, examples of which are [4:2:0], [4:2:2], and [4:4:4] according to the MPEG standard. With respect to the pixel value range, the range of possible values that a pixel can take might be 0 to 255 for standard MPEG data, etc, and −128 to 127 for DV camera recorders, and the like.

Command decoder 25 reads a microcode sequentially from each of the microprograms stored in command memory 24, analyses the read microcodes, and controls the various elements within POUA 207 in accordance with the results of the analysis.

Instruction circuit 26 receives an instruction (initiating address, etc) from POUC 209 indicating which of the microprograms stored in command memory 24 to activate, and activates the indicated one or more microprograms.

DDA circuit 27 selectively controls the filter coefficients stored in input buffer group 22 during the filtering.

1.2 Structure of the Pixel Parallel-Processing Unit

Figure 4:
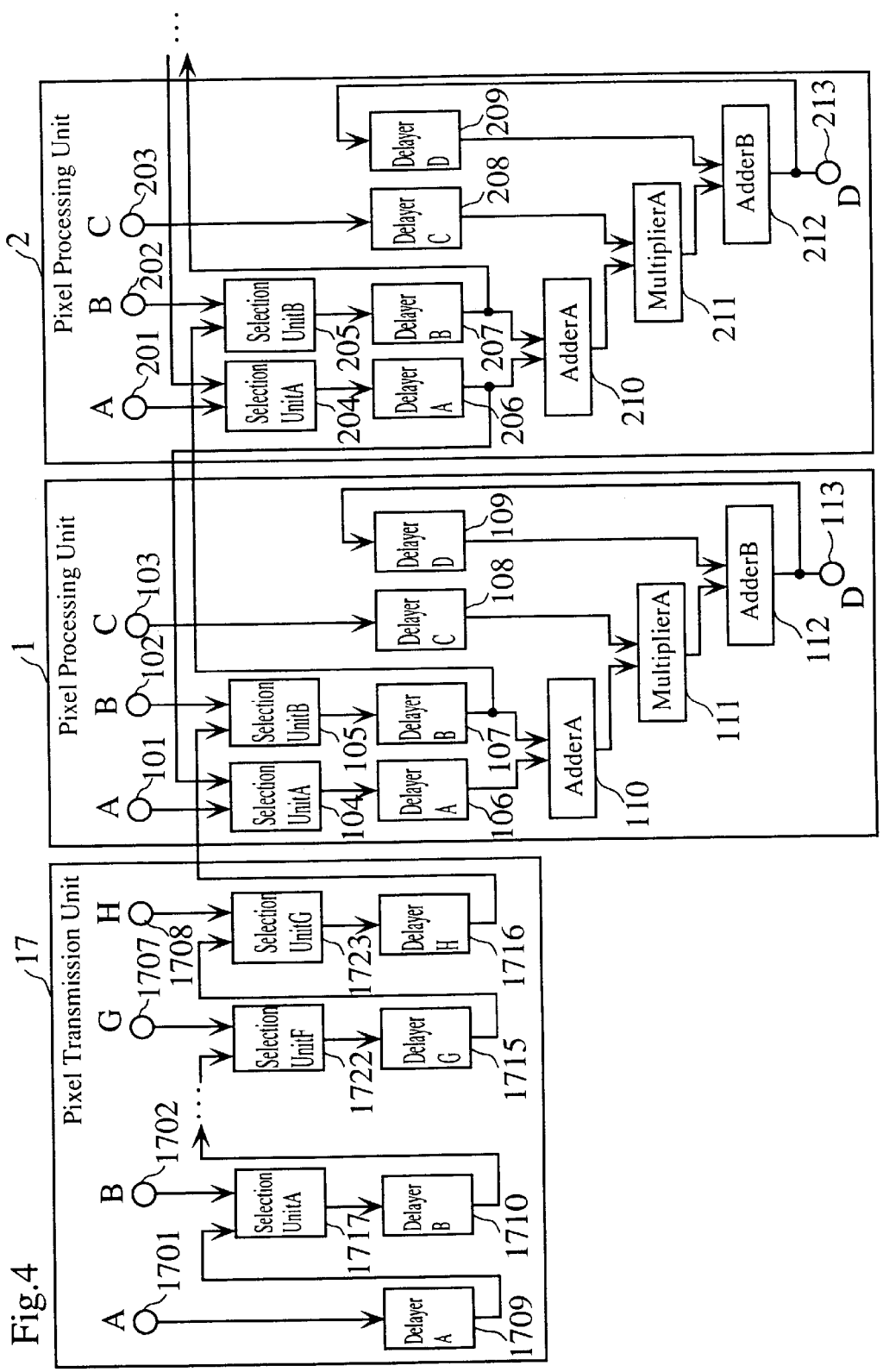
FIG. 4 is a block diagram showing a structure of a left-hand section of a pixel parallel-processing unit.
Figure 5:
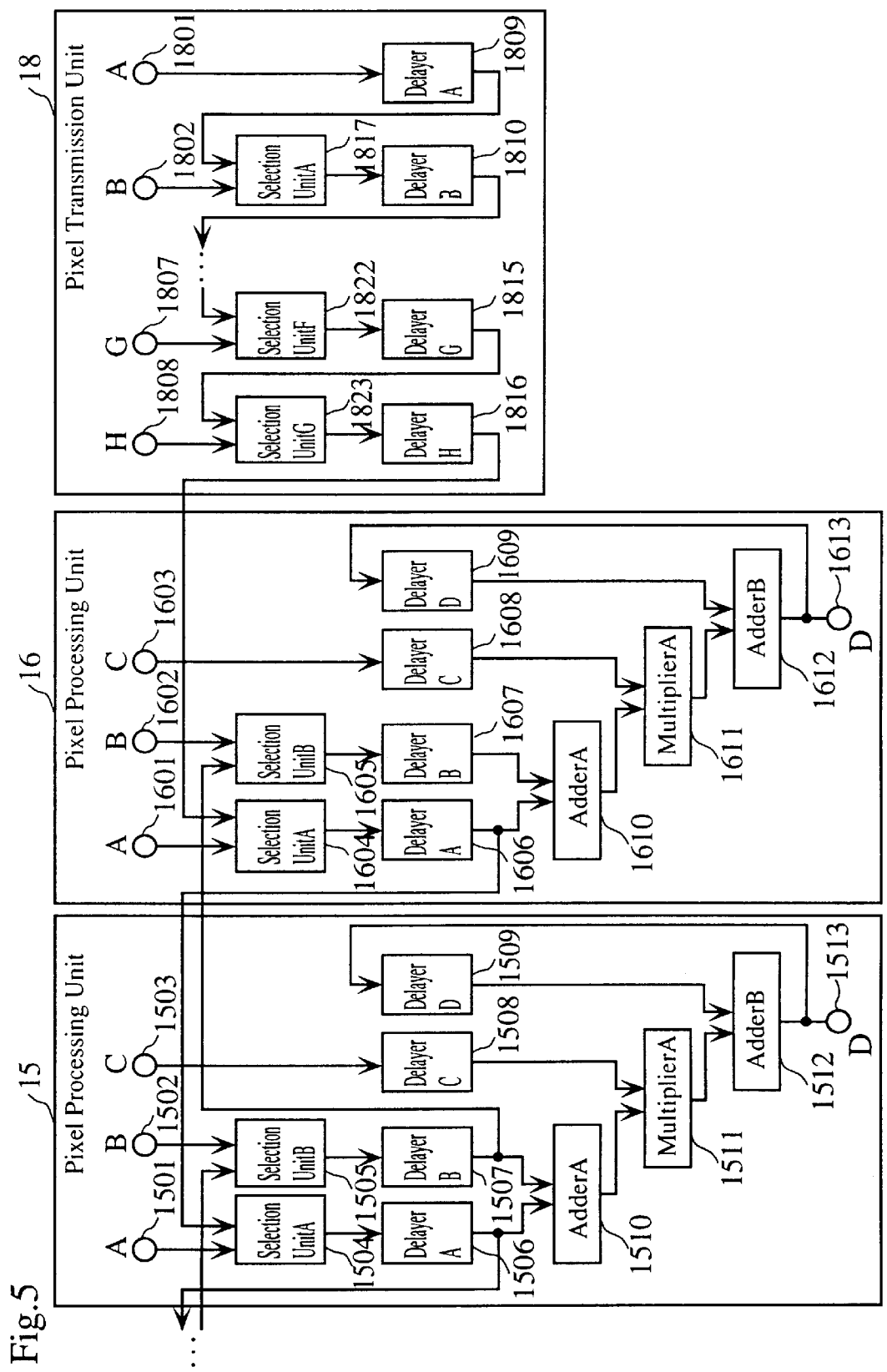
FIG. 5 is a block diagram showing a structure of a right-hand section of the pixel parallel-processing unit.

FIGS. 4 and 5 are block diagrams showing in detail a structure of the left and right sections, respectively, of the pixel parallel-processing unit.

Pixel transmission unit 17 in FIG. 4 includes eight input ports A1701 to H1708, eight delayers A1709 to H1716 for storing pixel data and delaying the stored pixel data by one clock cycle, and seven selection units A1717 to G1723 for selecting either the input from the corresponding input port or the output from the delayer adjacent on the left. Pixel transmission unit 17 functions to input eight pixels in parallel from input buffer group 22, store the eight pixels in the eight delayers, one pixel per delayer, and shift the pixels stored in the eight delayers one position to the right per clock cycle.

The structure of pixel transmission unit 18 in FIG. 5 is identical to that of pixel transmission unit 17 except for the direction of the shift (i.e. to the left instead of the right). As such the description of pixel transmission unit 18 has been omitted.

Furthermore, because the structure of the sixteen pixel processing units 1 to 16 in FIGS. 4 and 5 are identical, pixel processing unit 2 will be described below as a representative structure.

Pixel processing unit 2 includes input ports A201 to C203, selection units A204 and B205, delayers A206 to D209, adders A120 and B212, a multiplier A211, and an output port D213.

Selection unit A204 selects either the pixel data inputted from input port A201 or the pixel data outputted from pixel transmission unit 17 adjacent on the left.

Selection unit A204 and delayer A206 also function to shift-output the pixel data inputted from pixel processing unit 3 adjacent on the right to pixel processing unit 1 adjacent on the left.

Selection unit B205 selects either the pixel data inputted from input port B202 or the pixel data shift-outputted from external memory 220 adjacent on the right.

Selection unit B205 and delayer B207 also function to shift-output the pixel data inputted from pixel processing unit 1 adjacent on the left to pixel processing unit 3 adjacent on the right.

Delayers A206 and B207 store the pixel data selected by selection units A204 and B205, respectively.

Delayer C208 stores the pixel data inputted from input port C203.

Adder A210 sums the pixel data outputted from delayers A206 and B207.

Multiplier A211 multiplies the output of adder A210 with the pixel data outputted from delayer C208. When filtering is performed, multiplier A211 is applied to multiply pixel data outputted from adder A210 with a filter coefficient outputted from delayer C208.

Adder B212 sums the output from multiplier A211 and the pixel data outputted from delayer D209.

Delayer D209 stores the output from adder B212.

As described above, pixel processing unit 2 performs the (a) filtering, (b) motion compensation, (c) OSD processing, and (d) motion estimation by selectively applying the above elements. The selective application of the above elements is controlled by command memory 24 and command decoder 25 in accordance with the microprograms stored command memory 24.

Figure 6A:
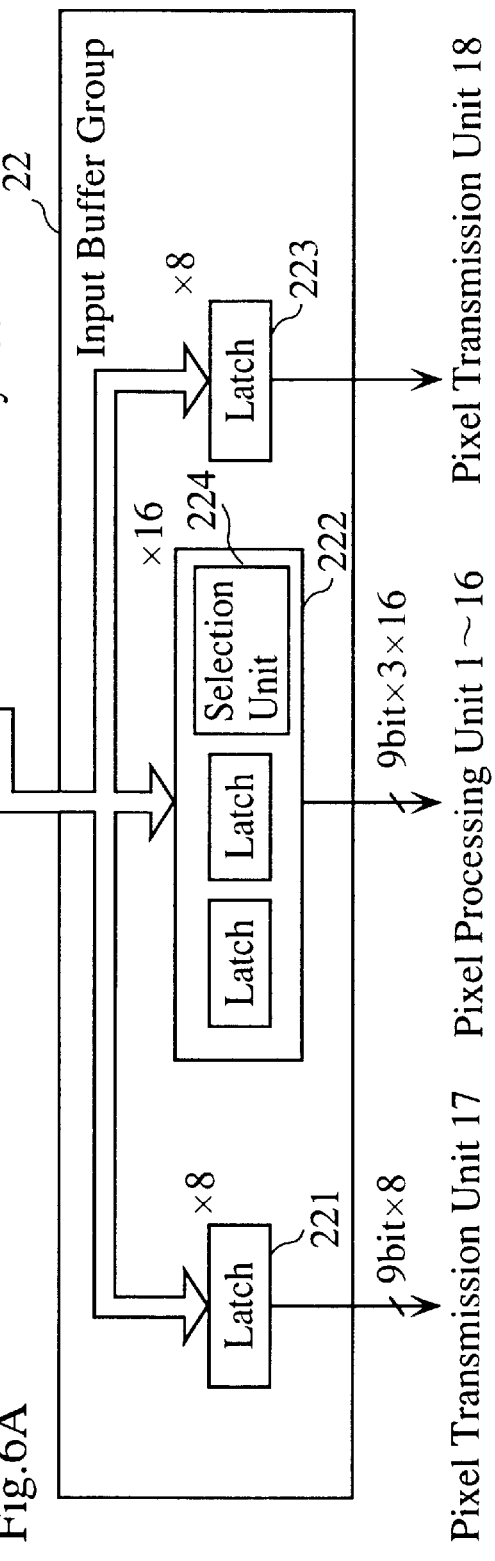
FIG. 6(*a*) is a block diagram showing in detail a structure of an input buffer group 22.

FIG. 6(a) is a block diagram showing in detail a structure of input buffer group 22.

As shown in FIG. 6(a), input buffer group 22 includes eight latch units 221 for supplying pixel data to pixel transmission unit 17, sixteen latch units 222 for supplying pixel data to pixel processing units 1 to 16, and eight latch units 223 for supplying pixel data to pixel transmission unit 18. Under the control of POUC 209, the pixel data is sent from external memory 220 to latch units 222 via dual port memory 100.

Each of the latch units 222 includes (i) two latches for supplying pixel data to input port A and B of the pixel processing units and (ii) a selection unit 224 for supplying either pixel data or a filter coefficient to input port C of each of the pixel processing units.

Figure 6B:
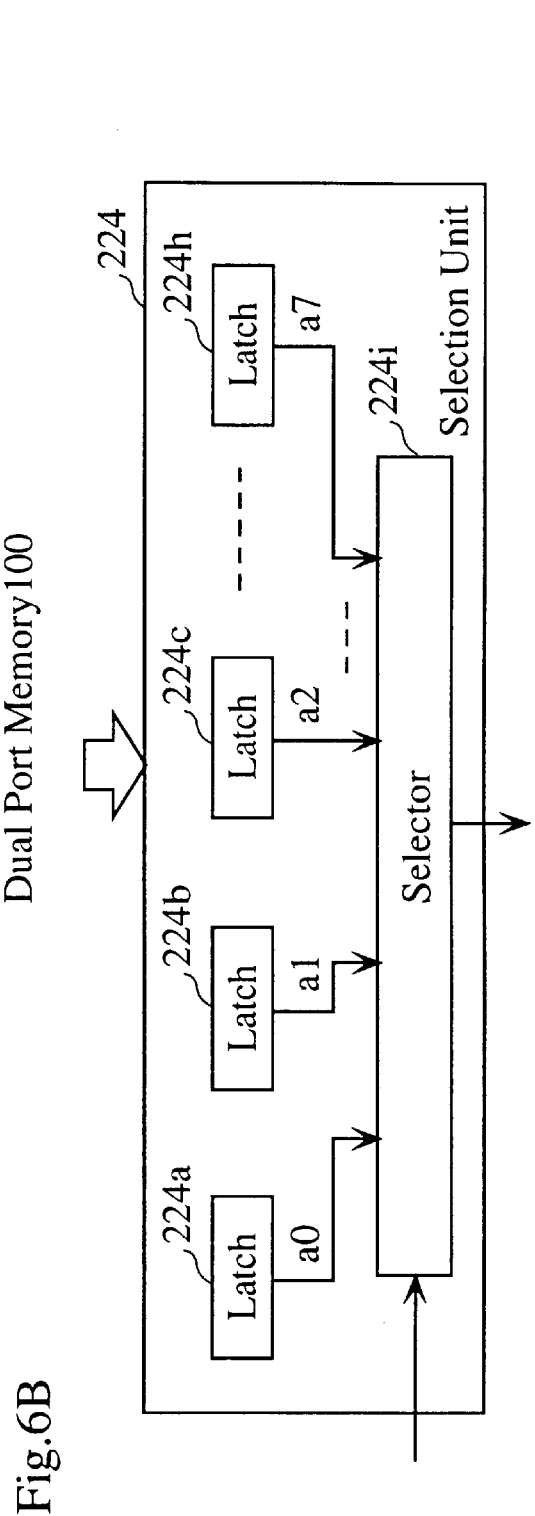

FIG. 6(b) is a block diagram showing in detail a structure of selection unit 224.

As shown in FIG. 6(b), selection unit 224 includes eight latches 224a to 224h and a selector 224i for selecting pixel data outputted from one of the eight latches.

In the filtering, latches 224a to 224h store filter coefficients a0 to a7 (or a0/2, a1~a7). These filter coefficients are sent, under the control of POUC 209, from external memory 220 to latches 224a to 224h via dual port memory 100.

Under the control of DDA circuit 27, selector 224i selects each of latches 224a to 224h sequentially, one latch per clock cycle. Thus the supply of filter coefficients to the pixel processing units is made faster because it is ultimately controlled by DDA circuit 27 (i.e. by the hardware) rather than being under the direct control of the microcodes of the microprograms.

Figure 7:
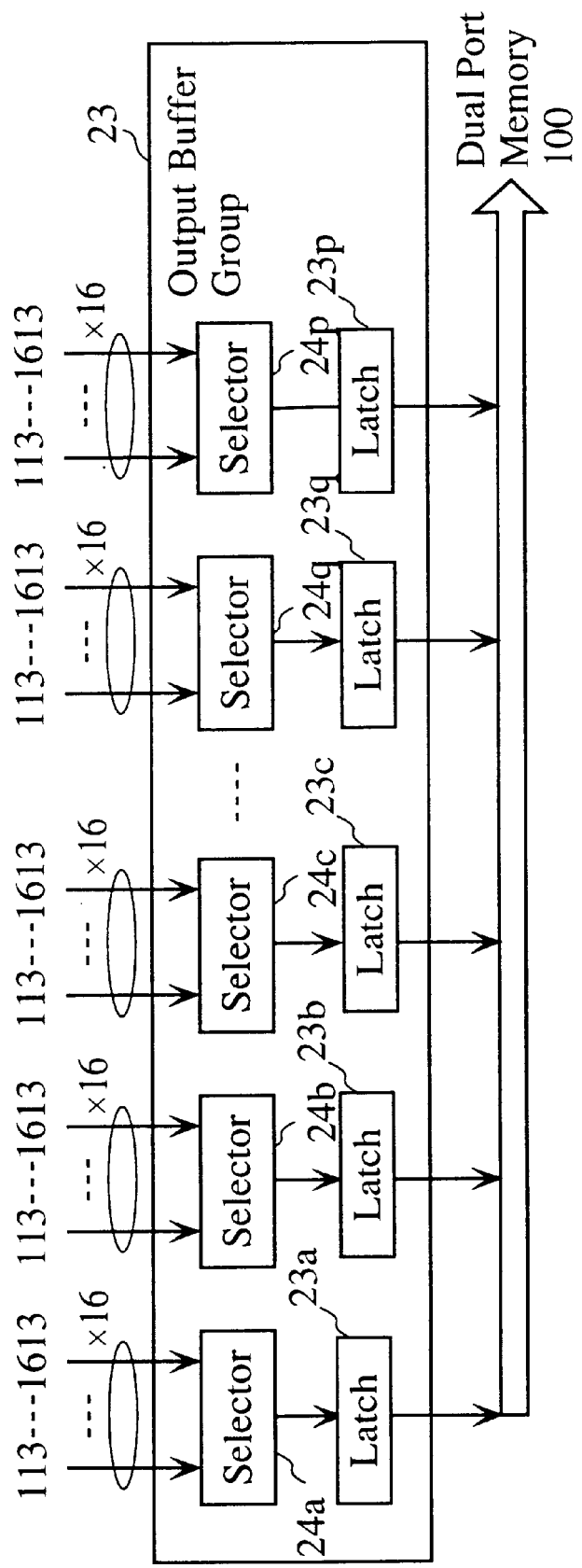
FIG. 7 is a block diagram showing a structure of an output buffer group 23.

FIG. 7 is a block diagram showing a structure of output buffer group 23. As shown in FIG. 7, output buffer group 23 includes sixteen selectors 24a to 24p and sixteen latches 23a to 23p.

Under the control of command decoder 25, the sixteen processing results outputted from pixel processing units 1 to 16 are inputted into each of selectors 24a to 24p, each of which selects one of the inputted processing results.

Latches 23a to 23p store the selection results outputted from selectors 24a to 24p, respectively.

Thus to downscale the result of the filtering by ½, for example, eight selectors 24a to 24h select the eight processing results outputted from the odd numbered pixel processing units 1 through 15 and the selection result is stored in latches 23a to 23h, respectively. Then, with respect to the next 16 processing results outputted from pixel processing units 1 to 16, the eight selectors 24i to 24p select the eight processing results outputted from the even numbered pixel processing units 2 through 16, and the selection result is stored in latches 23i to 23p, respectively. Thus the pixel data is decimated, and the ½ downscaled pixel data is stored in output buffer group 23, before being sent, under the control of POUC 209, to external memory 220 via dual port memory 100.

2.1 Filtering

The following is a detailed description of the filtering performed in pixel operation unit POUA 207 (or POUB 208).

POUC 209 identifies a macroblock to be filtered, sends 32 pieces of pixel data X1 to X32 and filter coefficients a0/2, a1~a7 as initial input values to input buffer group 22 in POUA 207, and instructs instruction circuit 26 to initiate the filtering and send notification of the number of taps.

FIG. 8 shows the initial input values when filtering is performed in pixel operation unit POUA 207 (or POUB 208). The input port column in FIG. 8 relates to the input ports of pixel transmission units 17, 18 and pixel processing units 1 to 16 in FIGS. 4 and 5, and the input pixel column shows the initial input values supplied to the input ports from input buffer group 22. The output port column in FIG. 8 relates to output port D of pixel processing units 1 to 16 in FIGS. 4 and 5, and the output pixel column shows the output of output port D (i.e. output of adder B).

Figure 9:
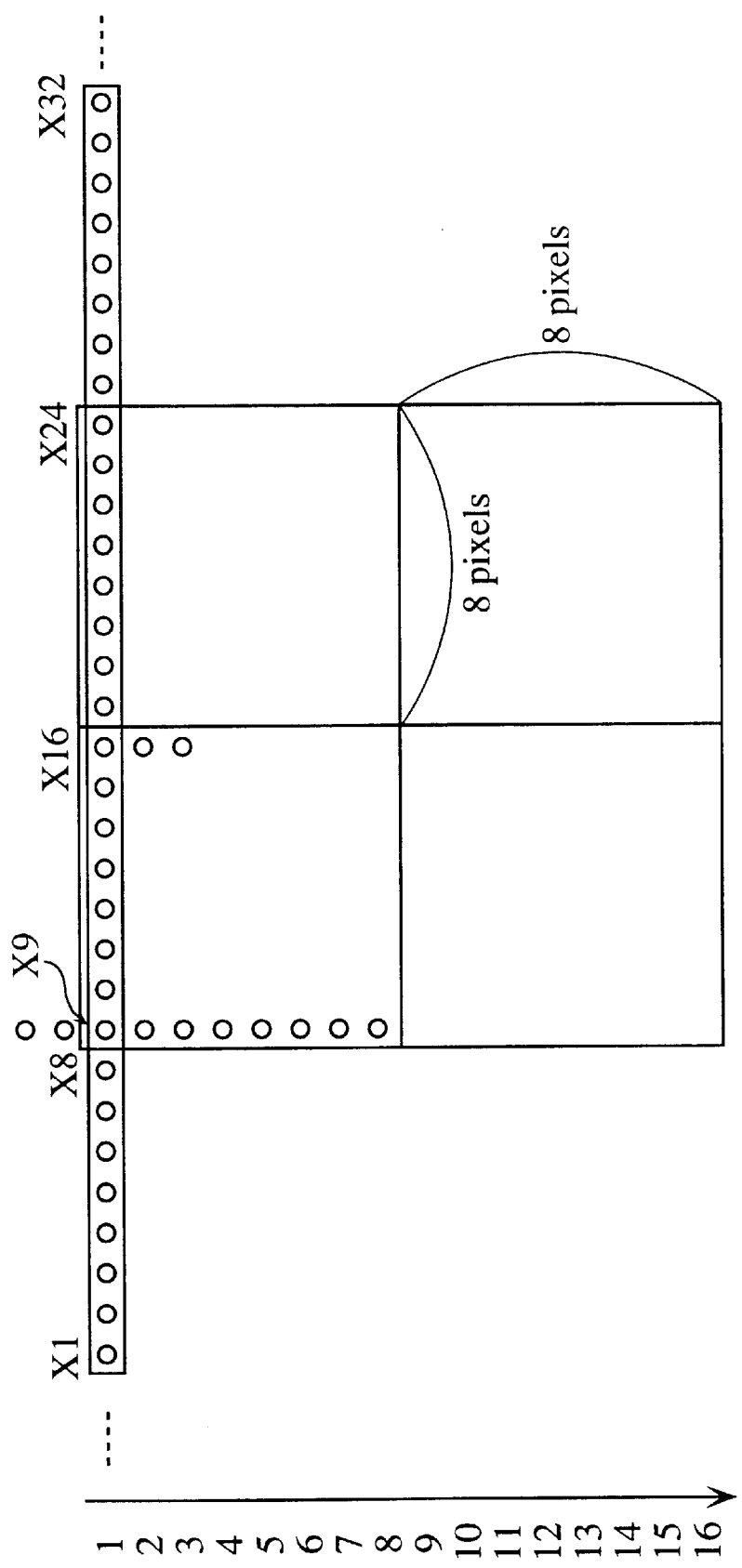
FIG. 9 shows in simplified form the initial input values of pixel data into the pixel parallel-processing unit.

FIG. 9 shows in detail the initial input values of pixel data into POUA 207.

Under the control of POUC 209, the 32 pieces of horizontally contiguous pixel data X1 to X32 shown in FIG. 9 are sent to input buffer group 22, from where they are supplied to the input ports of the pixel processing units. Of these, the sixteen pieces of pixel data X9 to X24 are targeted for filtering.

As shown in FIG. 8, the pixel data X9 to X24 and the filter coefficient a0/2 (selected in input buffer group 22) are supplied as initial input values to input ports A/B and C, respectively, of pixel processing units 1 to 16.

Once the initial input values have been supplied to pixel parallel-processing unit 21 from input buffer group 22, the filtering is carries out over a number of clock cycles, the number of clock cycles being determined by the number of taps.

Figure 11:
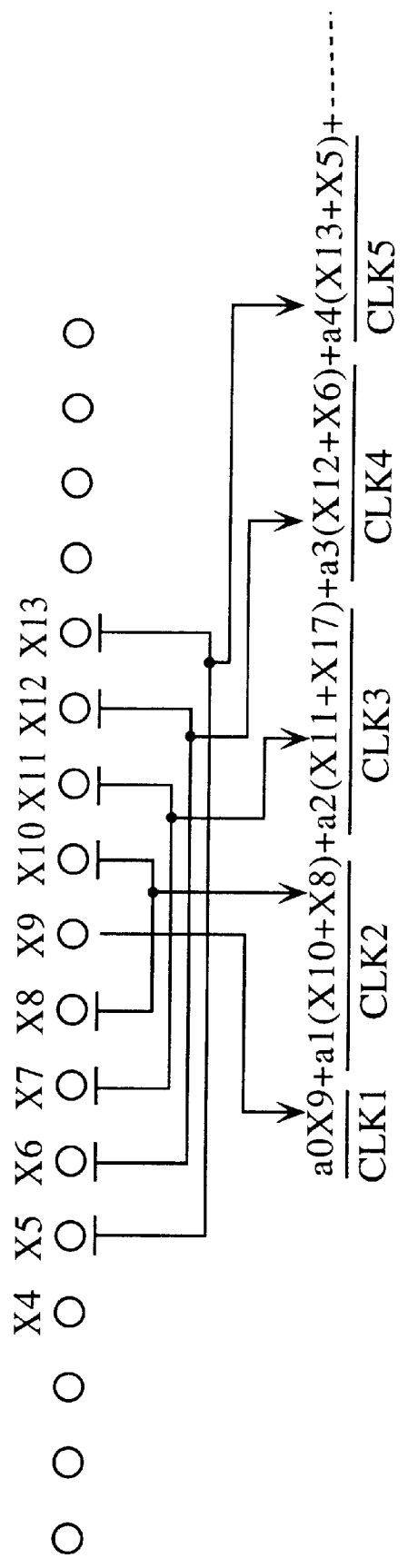
FIG. 11 shows in detail the operations performed in pixel processing unit 1 as part of the filtering.

Taking pixel processing unit 1 as an example, FIG. 10 shows the operations performed in pixel processing units 1 to 16. Shown in FIG. 10 are the stored contents of delayers A to D and the output of adder B per clock cycle. FIG. 11 shows in detail the output of output port D (i.e. output of adder B) per clock cycle.

During a first clock cycle (CLK1), delayers A and B both store pixel data X9, delayer C stores filter coefficient a0/2, and the accumulative value in delayer D remains at 0. In other words, during CLK1 selection units A and B both select input ports A and B, respectively, and as a result, adder A outputs (X9+X9), multiplier A outputs (X9+X9)*0/2, and adder B outputs (X9+X9)*a0/2+0 (i.e. a0*X9 as shown in FIG. 11).

From a second clock cycle (CLK2) onward, selection units A and B do not select the input from their respective input ports. Rather selection units A and B both select the shift-output from the pixel transmission unit or pixel processing unit lying adjacent on the left and right, respectively.

Thus during the second clock cycle (CLK2), delayers A to D in pixel processing unit 1 store pixel data X10, X8 and filter coefficients a1, a0*X9, respectively, and as shown in FIG. 11, adder B outputs a0*X9+a1 (X10+X8). In other words, during CLK2 multiplier A multiplies the output of adder A (i.e. sum of shift-outputted pixel data X10 and X8) by filter coefficient a1 from delayer C. Adder B then sums the output of multiplier A and the accumulative value from delayer D.

The operation during a third clock cycle (CLK3) is the same as that performed during the second clock, the resultant output of adder B being: a0*X9+a1(X10+X8)+a2(X11+X7).

The operation during a fourth to ninth clock cycle (CLK4~CLK9) is again the same as that described above, the output of adder B being as shown in FIG. 11. The resultant output of adder B during the ninth clock cycle (i.e. the result of the filtering performed in pixel processing unit 1) is: a0*X9+a1(X10+X8)+a2(X11+X7)+a3(X12+X6)+a4 (X13+X5)+a5(X14+X4)+a6(X15+X3)+a7(X16+X2)+a8 (X17+X1).

Although FIG. 10 and FIG. 11 show the filtering being completed over nine clock cycles, the number of clock cycles is ultimately determined by a control of command decoder 25 in accordance with the number of taps as notified by POUC 209. Thus two clock cycles are needed to complete the filtering if the number of taps is three, three clock cycles if the number of taps is five, and four clock cycles if the number of taps is seven. In other words, n number of clock cycles is needed to complete the filtering for 2n−1 taps.

Command decoder 25 repeats the filtering described above sixteen times in order to process sixteen lines of sixteen pixels, thus completing four blocks (i.e. one macroblock) of filtering as shown in FIG. 9. The sixteen filtering results outputted from pixel processing units 1 to 16 are scaled in output buffer group 23 by performing either decimation (downscaling) or interpolation (upscaling). Under the control of POUC 209, the scaled pixel data is sent to external memory 220 via dual port memory 100 after every sixteen pieces that accumulate in output buffer group 23.

Command decoder 25 also functions to notify POUC 209 when filtering of the sixteenth line has been completed. POUC 209 then instructs POUA 207 to supply initial input values to pixel transmission units 17, 18 and pixel processing units 1 to 16 and to initiate the filtering of the following macroblock in the same manner as described above.

The filtering result outputted from pixel processing unit 2 during the ninth clock cycle is:
a0*X10+a1(X11+X9)+a2(X12+X8)+a3(X13+X7)+a4(X14+X6)+a5(X1 5+X5)+a6(X16+X4)+a7(X17+X3)+a8(X18+X2).

Likewise, the filtering result outputted from pixel processing unit 3 during the ninth clock cycle is:
a0*X11+a1(X12+X10)+a2(X13+X9)+a3(X14+X8)+a4(X15+X7)+a5(X16+X6)+a6(X17+X5)+a7(X18+X4)+a8(X19+X3)

The filtering results outputted from pixel processing units 4 to 16 are the same as above except for the respective positioning of the pixel data. The related descriptions have thus been omitted.

As described above, pixel parallel-processing unit 21 filters pixel data in parallel, sixteen pieces at a time, and allows for the number of clock cycles to be determined freely in response to the number of taps.

Although in FIG. 8 the initial input values supplied to input ports A, B, and C in pixel processing unit 1 are given as (X9, X9, a0/2), it is possible for these values to be either (X9, 0, a) or (0, X9, a0). While the initial input values have changed, the filtering performed by pixel processing units 2 to 16 is the same as described above.

2.2 Motion Compensation

The following is a detailed description of the MC processing performed in POUA 207 (or POUB 208) when the target frame to be decoded is a P picture.

POUC 209 instructs instruction circuit 26 to begin the MC processing and identifies (i) a macroblock (encoded as an array of differential values) within the target frame that is to undergo MC processing and (ii) a rectangular area within the reference frame that is indicated by a motion vector. POUC 209 also sends to input buffer group 22 sixteen differential values D1 to D16 from the macroblock identified within the target frame and sixteen pieces of pixel data PI to P16 from the rectangular area identified within the reference frame.

FIG. 12 shows the I/O values when MC processing of a P picture is performed in pixel operation unit POUA 207 (or POUB 208). In FIG. 12, the input port column relates to the input ports of pixel transmission unit 17, 18 and pixel processing unit 1 to 16 in FIGS. 4 and 5, and the input pixel column shows the pixel data, differential values, and filter coefficients inputted into the input ports (the value of pixel data inputted into pixel transmission units 17 and 18 is not relevant in this case, since pixel transmission units 17 and 18 are not applied during MC processing). The output port column in FIG. 12 relates to output port D of pixel processing units 1 to 16 in FIG. 4 and 5, and the output pixel column shows the output of output port D (i.e. output of adder B).

Figure 13:
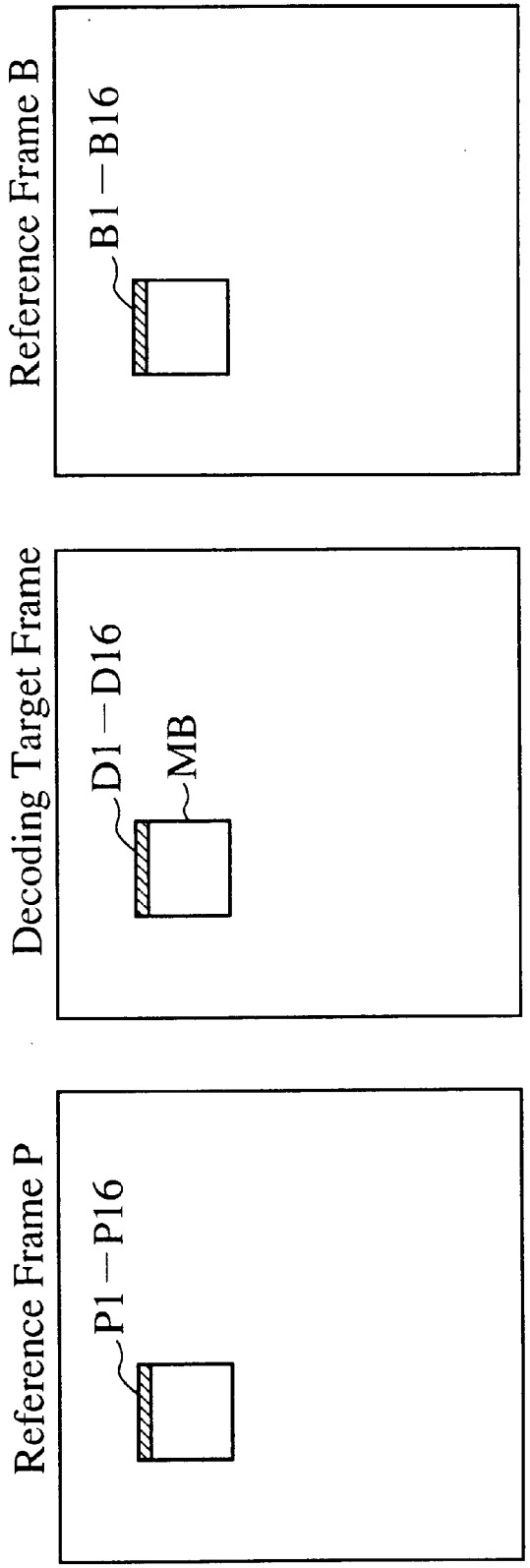
FIG. 13 shows in detail a decoding target frame and reference frames utilized in MC processing.

FIG. 13 shows in detail the decoding target frame and the reference frames utilized in MC processing. In FIG. 13, D1 to D16 are sixteen differential values from the macroblock (MB) identified within the target frame, and P1 to P16 are sixteen pieces of pixel data from the rectangular area within the reference frame indicated by the motion vector (note: B1~B16 from reference frame B are utilized during the MC processing of a B picture described below, and not during the MC processing of the P picture currently being described).

In the MC processing, selection units A and B in each of pixel processing units 1 to 16 always select input ports A and B, respectively. The pixel data inputted from input port A and the differential value inputted from input port B are stored in delayers A and B via selectors units A and B, respectively, and then summed in adder A. The output of adder A is multiplied by 1 in multiplier A, summed with zero in adder B (i.e. passes unchanged through adder B), and outputted from output port D. In other words, the output of output port D is simply the summation of the pixel data (input port A) and the differential value (input port B).

The 16 processing results outputted from output port D of pixel processing units 1 to 16 are stored in output buffer group 23, and then under the control of POUC 209, the 16 processing results are sent to external memory 220 via dual port memory 100 and written back into the decoding target frame stored in external memory 220.

MC processing of the macroblock identified in the target frame (P picture) is completed by repeating the above operations sixteen times in order to process the sixteen lines of sixteen pixels. Sixteen processing results are outputted from pixel parallel-processing unit 21 per clock cycle, since simple arithmetic is the only operation performed by pixel processing units 1 to 16.

FIG. 14 shows I/O values when MC processing of a B picture is performed in pixel operation unit POUA 207 (POUB 208). The columns in FIG. 14 are the same as in FIG. 12 except for the input pixel column, which is divided into a first clock cycle (CLK1) input and a second clock cycle (CLK2) input.

As shown in FIG. 13, P1 to P16 and B1 to B16 are pixel data within a rectangular area of two different reference frames, the respective rectangular areas being indicated by a motion vector.

As mentioned above, in the MC processing, selection units A and B of pixel processing units 1 to 16 always select input ports A and B, respectively. Taking pixel processing unit 1 as an example, P1 and B1 are inputted from input ports A and B during the first clock cycle (CLK1) and stored in delayers A and B via selection units A and B, respectively. Also during CLK1, a filter coefficient ½ is inputted from input port C and stored in delayer C. Thus the operation performed in multiplier A is (P1+B1)/2.

During the second clock cycle (CLK2), the output of multiplier A is stored in delayer D, and (1, 0, D1) are inputted from input ports A, B and C and stored in delayers A, B and C, respectively. As a result, Dl from multiplier A and (P1+B1)/2 from delayer D are summed in adder B, and (P1+B1)/2+D1 is outputted from output port D.

The 16 processing results outputted from pixel parallel-processing unit 21 are stored in output buffer group 23, and then under the control of POUC 209, the 16 processing results are sent to external memory 220 via dual port memory 100 and written back into the decoding target frame stored in external memory 220.

MC processing of the macroblock identified in the target frame (B picture) is completed by repeating the above operations sixteen times in order to process the 16 lines of 16 pixels.

2.3 On-Screen Display (OSD) Processing

POUC 209 instructs instruction circuit 26 to initiate the OSD processing, reads sixteen pieces of pixel data X1 to X16 sequentially from an OSD image stored in external memory 220, and sends the read pixel data X1 to X16 to input buffer group 22.

FIG. 15 shows I/O values when OSD processing is performed in pixel operation unit POUA 207 (or POUB 208).

As with the MC processing described above, pixel transmission units 17 and 18 are not applied in the OSD processing. Pixel data X1 to X16 are inputted from buffer group 22 into input port A of pixel processing units 1 to 16, respectively, and 0 and 1 is inputted into each of input ports B and C, respectively, as shown in FIG. 15.

Figure 16:
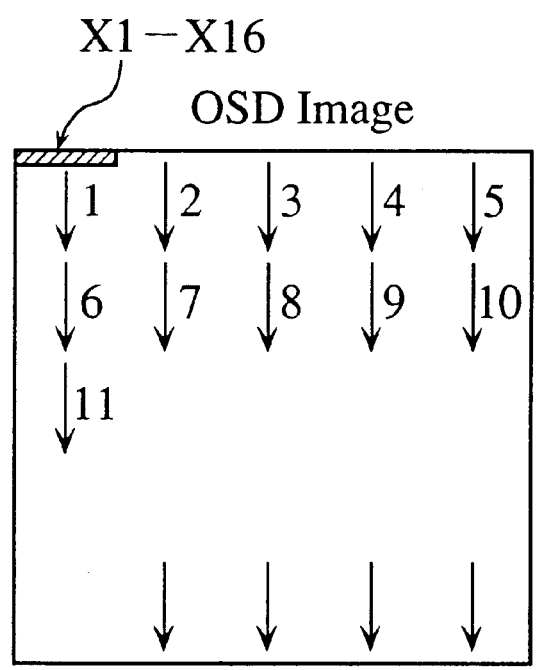
FIG. 16 shows in detail the OSD processing performed in the pixel operation unit.

FIG. 16 shows the pixel data of the OSD image being written into input buffer group 22 sequentially, sixteen pieces at a time.

In the OSD processing, selection units A and B of pixel processing units 1 to 16 always select input ports A and B, respectively. In pixel processing unit 1, for example, pixel data X1 inputted from input port A and 0 inputted from input port B are stored in delayers A and B, respectively, and then summed in adder A (i.e. X1+0=X1).

In multiplier A the output of adder A is multiplied by 1 from input port C and the output of multiplier A and zero are summed in adder B. The effective result of the operation is that pixel data X1 inputted from input port A is outputted from adder B in an unaltered state.

Pixel data X1 to X16 outputted from pixel parallel-processing unit 21 are stored in buffer group 23, and then under the control of POUC 209, they are sent to external memory 220 via dual port memory 100 where they overwrite the display frame data stored in external memory 220.

By repeating the above processing for the entire OSD image stored in external memory 220, as shown in FIG. 16, the display frame data in external memory 220 is overwritten with the OSD image. This is the most straightforward part of the OSD processing, POUA 207 (or POUB 208) functioning simply to transfer the pixel data in the OSD image to the display frame data stored in external memory 220, sixteen pieces at a time.

As a further embodiment of the OSD processing, it is possible to combine the OSD image and the display frame data. When the combination ratio is 0.5, for example, it is desirable for input buffer group 22 to supply the OSD image pixel data to input port A and the display frame data to input ports B of each of pixel processing units 1 to 16.

Again, when the combination ratio is α: (1−α), it is desirable for input buffer group 22 to supply (OSD image pixel data, 0, α) to input ports A, B, and C, respectively, during a first clock cycle, and (0, display frame data, 1−α) to input ports A, B, and C, respectively, during a second clock cycle.

When downscaling an OSD image for display, it is desirable to filter the OSD image pixel data stored in input buffer group 22 as described above before conducting the OSD processing. The downscaled pixel data outputted from the OSD processing is stored in output buffer group 23 as described above, and then overwritten into the desired position within the display frame data stored in external memory 220.

The OSD image pixel data and the display frame data can be combined as described above after conducting the filtering to downscale the OSD image.

2.4 Motion Estimation

FIG. 17 shows I/O values when ME processing is performed in pixel operation unit POUA 207 (or POUB 208). In the input pixel column of FIG. 17, X1 to X16 are sixteen pixels of a macroblock within a frame to be encoded, and R1 to R16 are sixteen pixels of a 16 times 16 pixel rectangular area within a motion vector (MV) search range of a reference frame. FIG. 18 shows the relationship between X1 to X16 and R1 to R16.

The MV search range within the reference frame of FIG. 18 is the range within which a search is conducted for a motion vector in the vicinity of the macroblock of the target frame. This range can be defined, for example, by an area within the reference frame of +16 to −16 pixels in both the horizontal and vertical directions around the target macroblock. When the MV search is conducted per pixel (or per half pel), the 16 times 16 pixel rectangular area occupies 16 times 16 (or 32×32) positions. FIG. 13 shows only the rectangular area in the upper left (hereafter, first rectangular area) of the MV search range.

In the ME processing, the sum total of differences between the pixels in the target macroblock and the pixels in each of the rectangular areas of the MV search range is calculated, and the rectangular area with the smallest sum total of differences (i.e. the rectangular area exhibiting the highest correlation with the target macroblock) is identified. The relative positional displacement between the identified rectangular area and the target macroblock is determined as the motion vector. The target macroblock is encoded as an array of differential values rather than pixels, the differential values being calculated in relation to the pixels of the highly correlated rectangular area identified within the MV search range.

The sum total of differences between the first rectangular area and the target macroblock is calculated as follows. Under the control of POUC 209, pixel data X1 to X16 from the macroblock and pixel data R1 to R16 from the first rectangular area are sent to input buffer group 22. The pixel data R1 to R16 are sent at a rate of one line per clock cycle, and the sixteen lines of the first rectangular area are stored in input buffer group 22 as a result.

Taking pixel processing unit 1 in FIG. 4 as an example, during the first clock cycle, X1 and R1 are inputted from input ports A and B, respectively, adder A outputs the absolute value of X1 minus R1, and multiplier A multiplies the output of adder A by 1 from input port C. Adder B then sums the output from multiplier A and the data accumulated in delayer D, and outputs the result. Processing of line 1 of the first rectangular area thus results in |X1−R1| being outputted from adder B and accumulated in delayer D during the first clock cycle.

During the second clock cycle, adder B sums |X1−R1| from multiplier A and |X1−R1| of line 1 from delayer D, and the result is accumulated in delayer D.

During the third clock cycle, adder B sums |X1−R1| from multiplier A and |X1−R1| of line 1 and 2 stored in delayer D, and the result is again accumulated in delayer D.

Through a repetition of the above operation, adder B of pixel processing unit 1 outputs the accumulative value of |X1−R1| of the sixteen lines comprising the first rectangular area (i.e. Σ|X1−R1|) during the sixteenth clock cycle.

Also, according to the same operation described above for pixel processing unit 1, pixel processing units 2 to 16 output the accumulative values Σ|X2−R2| to Σ|X16−R16|, respectively, during the sixteenth clock cycle.

During the seventeenth clock cycle, the sixteen accumulative values outputted from pixel processing units 1 to 16 are stored in output buffer group 23, and then under the control of POUC 209, the sum total of the sixteen accumulative values (i.e. sum total of differences) for the first rectangular area is calculated and stored in a work area of external memory 220.

This completes the calculation of the sum total of differences between the pixels in the macroblock to be encoded and the pixels in the first rectangular area.

The same operations are performed in relation to the remaining rectangular areas within the MV search range in order to calculate the sum total of differences between the pixels in each of the rectangular areas and the pixels in the macroblock to be encoded.

When the sum totals of differences for all the rectangular areas (or all the required rectangular areas) in the MV search range has been calculated, then the rectangular area exhibiting the highest correlation (i.e. rectangular area having the smallest sum total of differences) is identified and a motion vector is generated with respect to the target macroblock.

In the ME processing described above, calculation of the sum totals of the 16 accumulative values outputted from pixel processing units 1 to 16 for each of the rectangular areas is performed separate of the pixel processing units. However, it is possible to have pixel processing units 1 to 16 calculate these sum totals. In this case, the sixteen accumulative values relating to the first rectangular area are sent directly from output buffer group 23 to the work area in external memory 220 without the sum total of differences being calculated in output buffer group 23. When the accumulative values relating to sixteen or more rectangular areas are stored in external memory 220, each of pixel processing units 1 to 16 is assigned one rectangular area, respectively, and the sum total of differences for each of the rectangular areas is then calculated by totaling the sixteen lines of accumulated values sequentially.

Furthermore, in the ME processing described above, the calculation of differences is performed per pixel (i.e. per full line), although it is possible to calculate the differences per half-pel (i.e. per half line in a vertical direction). Taking pixel processing unit 1 as an example, in the full line processing described above the output during the first clock cycle is $|X1-R1|$. However, in the case of half-pel processing the operation can, for example, be spread over two clock cycles. In this case, $((R1+R1')/2)$ and $|X1-(R1+R1')/2|$ is outputted during the first and second clock cycles, respectively. As a further example, the operation can be spread over five clock cycles. In this case, $((R1+R1'+R2+R2')/4)$ is outputted after the fourth clock cycle and the difference (i.e. $|X1-(R1+R1'+R2+R2')/4|$) is calculated during the fifth clock cycle.

3.1 Vertical Filtering (1)

Figure 19:
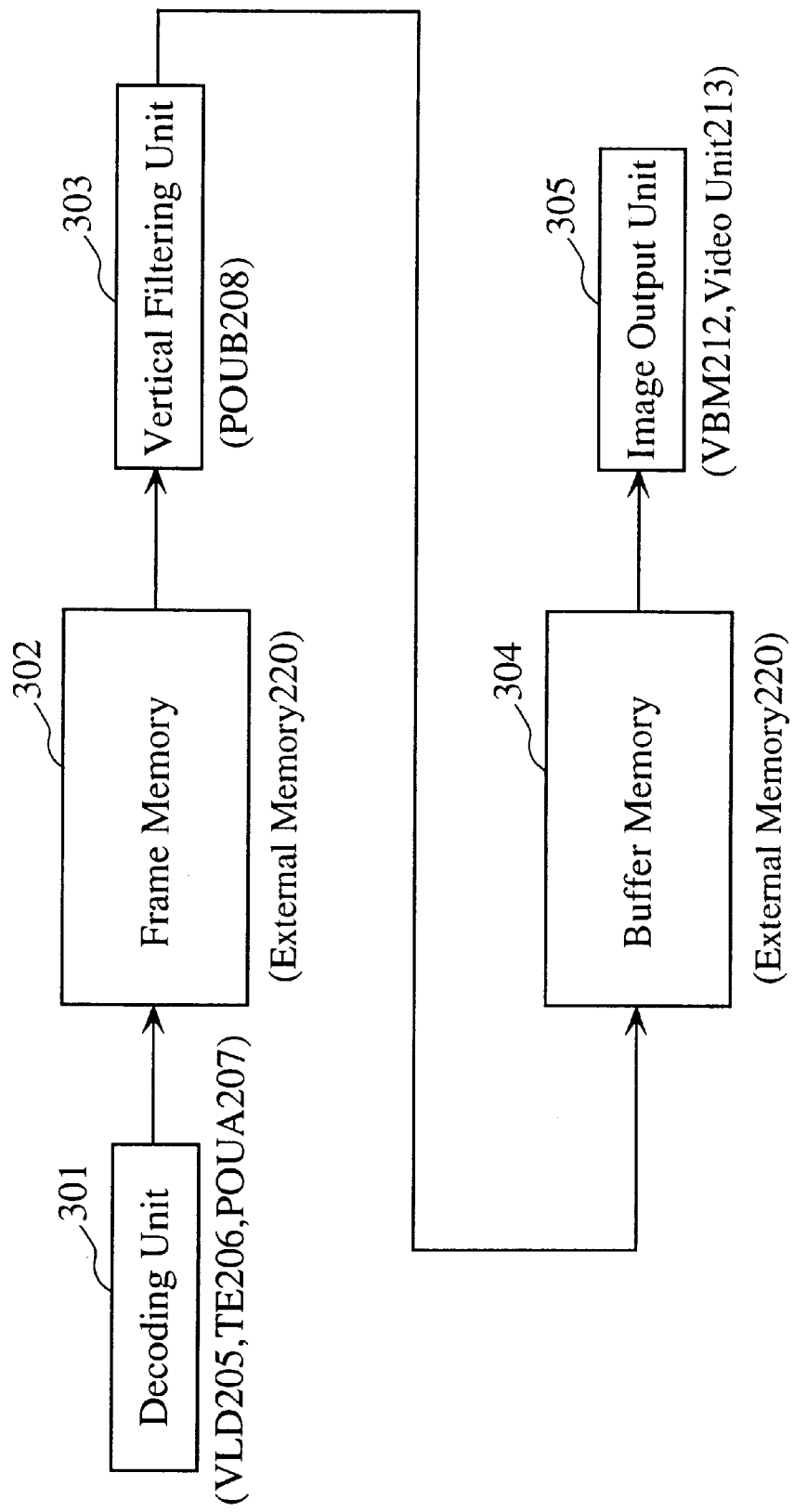
FIG. 19 is a simplified block diagram showing a flow of data when vertical filtering is performed in the media processor.

FIG. 19 is a block diagram showing in simplified form the data flow when vertical filtering is performed in the media processor shown in FIG. 2.

The media processor in FIG. 19 includes a decoding unit 301, a frame memory 302, a vertical filtering unit 303, a buffer memory 304, and an image output unit 405.

Decoder unit 301 in FIG. 19 is the equivalent of VLD 205 (decodes video elementary stream), TE 206, and POUA 207 (MC processing) in FIG. 2, and functions to decode the video elementary stream.

Frame memory 302 is the equivalent of external memory 220, and functions to store the video data (frame data) outputted from the decoding process.

Vertical filtering unit 303 is the equivalent of POUB 208, and functions to downscale the video data in a vertical direction by means of vertical filtering.

Buffer memory 304 is the equivalent of external memory 220, and functions to store the downscaled video data (i.e. display frame data).

Image output unit 305 is the equivalent of VBM 212 and video unit 213, and functions to convert the display frame data into image signals and to output the image signals.

POUA 207 and POUB 208 share the MC processing and the vertical filtering, POUA 207 performing the MC processing and POUB 208 performing the vertical filtering, for example.

Also, with respect to the horizontal downscaling of decoded video data stored in frame memory 302, this operation is performed by either POUA 207 or POUB 208.

3.1.1 ½ Downscaling

Figure 20:
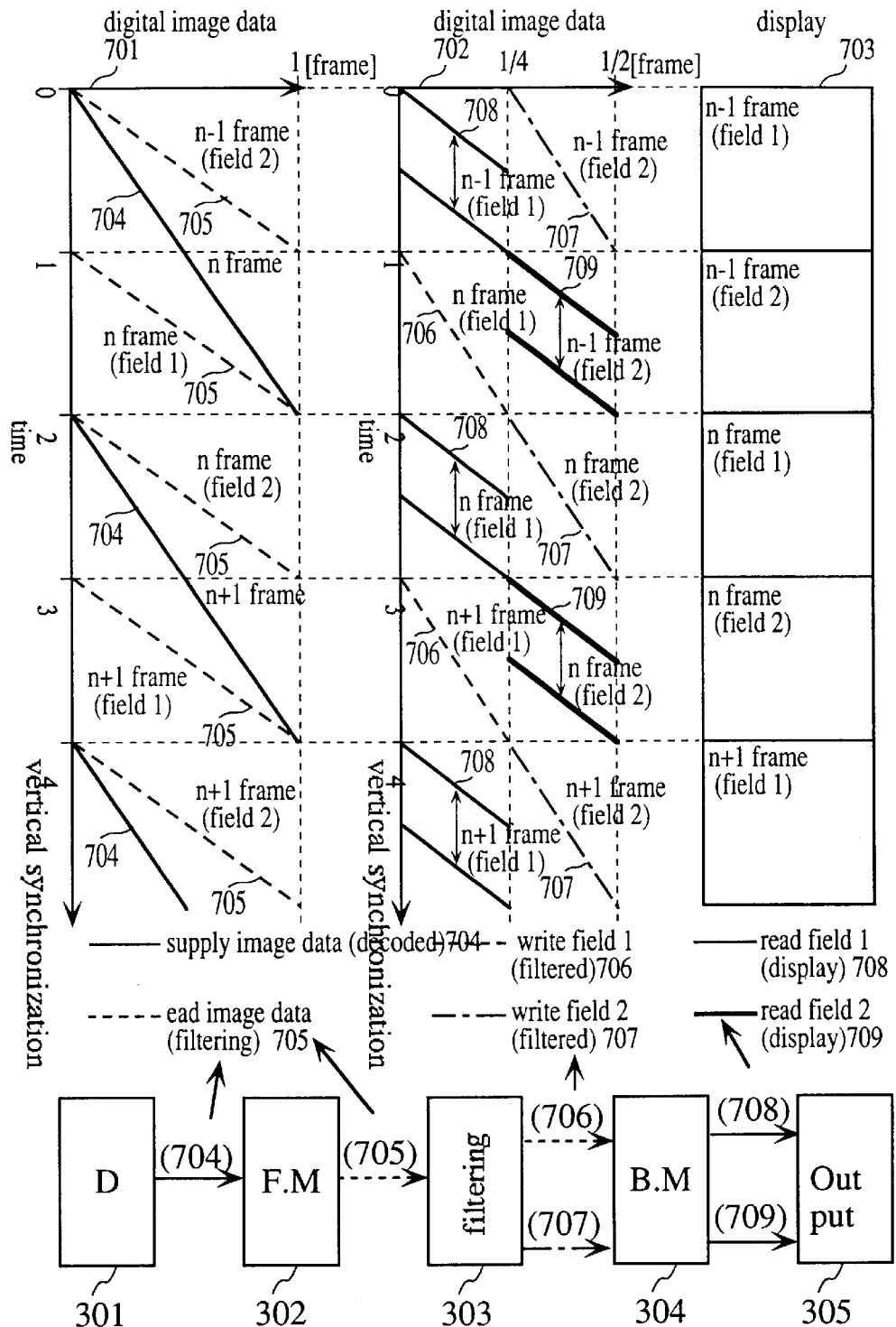
FIG. 20 shows in detail ½ downscaling in a vertical direction.

FIG. 20 shows the amount of data supplied over time to frame memory 302 and buffer memory 304 when ½ downscaling is performed according to the flow of data shown in FIG. 19.

The vertical axes of graphs 701 to 703 measure time and are identical. The unit of measurement is the vertical synchronization signal (VSYNC) cycle (V) of each field (½ frame) of frame data, and five cycles are shown in FIG. 20.

The horizontal axes of graphs 701 and 702 show the amount of data supplied to frame memory 302 and buffer memory 304, respectively. Graph 703 shows the particular frame or field being displayed in image output unit 305.

In graph 701, lines 704 show the supply of frame data from decoder unit 301 to frame memory 302, and lines 705 show the distribution of frame data from frame memory 302 to vertical filtering unit 303.

In graph 702, lines 706 and 707 show the supply of a down scaled image (fields 1 and 2, respectively) from vertical filtering unit 303 to buffer memory 304, and lines 708 and 709 show the supply of the downscaled image (field 1 and 2, respectively) from buffer memory 304 to image output unit 305.

In the ½ downscaling, the downscaled image can be positioned anywhere from the top half to the bottom half of the frame in image output unit 305. Thus the positioning of field 1 (lines 708) affects the timing of the supply of field 2 (lines 709) to image output unit 305.

As shown in graph 701, the supply of n frame from decoder unit 301 to frame memory 302 is controlled to commence immediately after the supply of field 2 (n−1 frame) from frame memory 302 to vertical filtering unit 303 has commenced, and to be complete immediately before to the supply of field 1 (n frame) from frame memory 302 to vertical filtering unit 303 is completed.

As shown in graph 702, the supply of field 1 and 2 (n frame) from vertical filtering unit 303 to buffer memory 304 is controlled to be complete within the display period of field 2 (n−1 frame) and field 1 (n frame), respectively.

When the above controls are performed, media processor 200 is required to have the capacity to supply one frame of frame data from decoder unit 301 to frame memory 302 in a 2V period, ½ frame (i.e. one field) from frame memory 302 to vertical filtering unit 303 in 1V, ¼ frame from vertical filtering unit 303 to buffer memory 304 in 1V, and ¼ frame from buffer memory 304 to image output unit 305 in a 1V. Decoder unit 301 is required to have the capacity to decode one frame in 2V, and vertical filtering unit 303 is required to have the capacity to filter ½ frame in 1V. Frame memory 302 is required to have the capacity to store one frame, and buffer memory 304 is required to have the capacity to store ½ frame.

Figure 21:
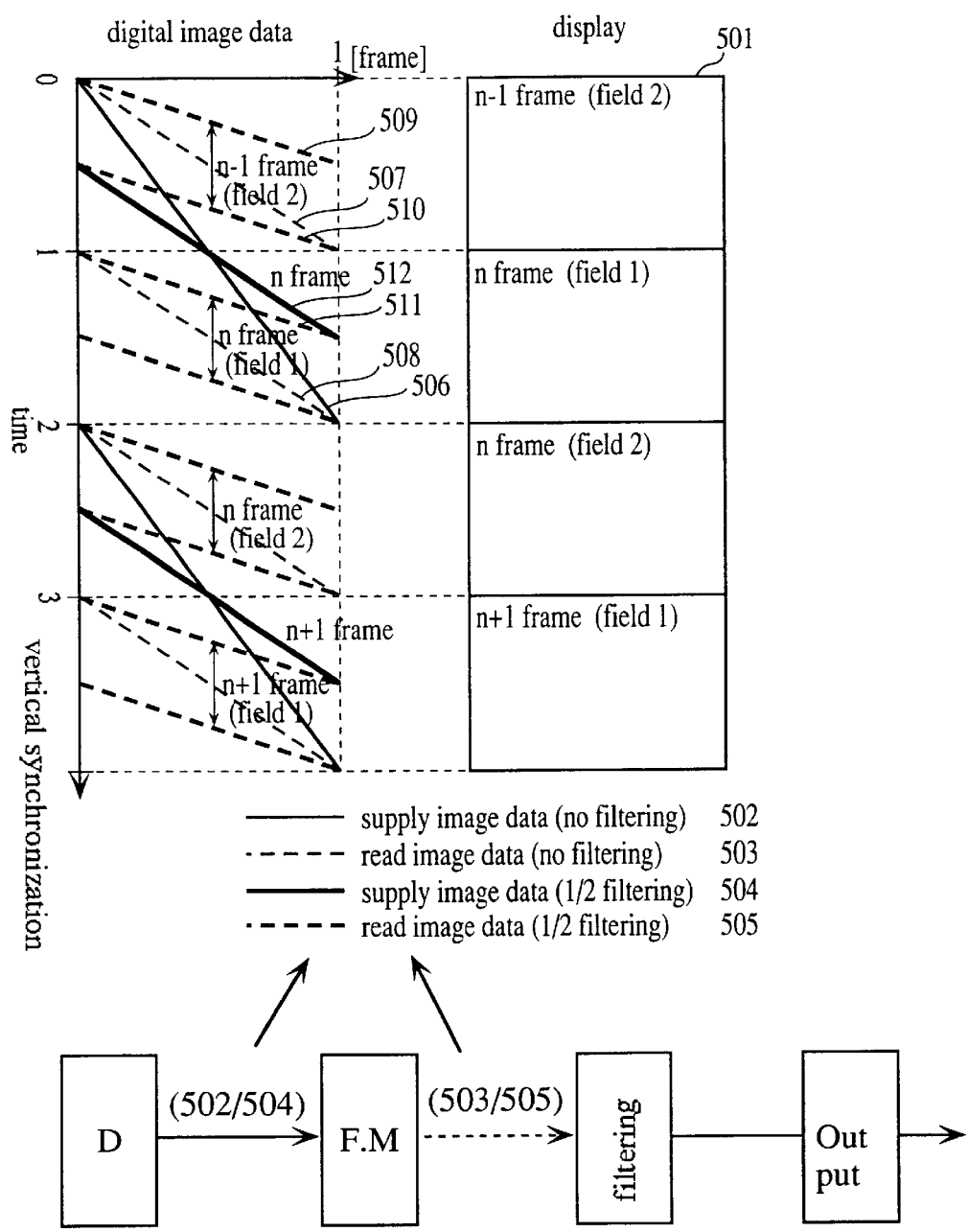
FIG. 21 shows in detail ½ downscaling in the vertical direction according to a prior art.

In comparison to FIG. 20, FIG. 21 shows the amount of data supplied over time when buffer memory 304 is not included in the structure.

When downscaling is not performed, the supply of n frame of frame data from decoder 301 to frame memory 302 (line 506) commences after the supply of field 2 (n−1 frame) to vertical filtering unit 303 (line 507) has commenced, and is completed before the supply of field 1 (n frame) to vertical filtering unit 303 is completed. Thus it is sufficient for media processor 200 to have the capacity to supply one frame of frame data to frame memory 302 within a 2V period.

The supply of field 1 (n frame) from frame memory 302 to vertical filtering unit 303 (line 508) is completed after the supply of n frame to frame memory 302 (line 506) has been completed, and the supply of field 2 (n frame) commences after the supply of field 1 (n frame) has been completed. Thus it is sufficient for media processor 200 to be able to supply ½ frame (i.e. one field) of frame data from frame memory 302 to vertical filtering unit 303 within a 1V period.

In comparison, when ½ downscaling is performed in a structure not including buffer memory 304, the timing of the supply of n frame to frame memory 302 varies according to the timing of the supply of field 2 (n–1 frame) to image output unit 305 (i.e. the desired positioning within the frame). Depending on the positioning, the supply of field 2 (n–I frame) to vertical filtering unit 303 can take place anywhere between lines 509 and 510. Thus at the very latest, the supply of n frame to frame memory 302 commences after the supply of field 2 (n–1 field) marked by line 510. In this case, the ½ downscaled image is outputted in the lower half of the frame in image output unit 305.

The supply of n frame to frame memory 302 (line 512) must, of course, be completed before the supply of field 1 (n frame) to vertical filtering unit 303 (line 511) has been completed. Thus it is necessary for media processor 200 to have the capacity to supply one frame of frame data from decoder 301 to frame memory 302 within a 1V period. This is twice the capacity required when downscaling is not performed.

The supply of field 1 (n frame) from frame memory 302 to vertical filtering unit 303 (line 511) is completed after the supply of n frame to frame memory 302 (line 512) has been completed, and the supply of field 2 (n frame) commences once the supply of field 1 (n frame) is completed. Thus it is necessary to supply one frame of frame data from decoding unit 301 to frame memory 302 within a ½V period. This is twice the capacity required when downscaling is not performed. Also, in order to match the supply of frame data, vertical filtering unit 303 is required to have a capacity twice that of when downscaling is not performed.

Figure 23:
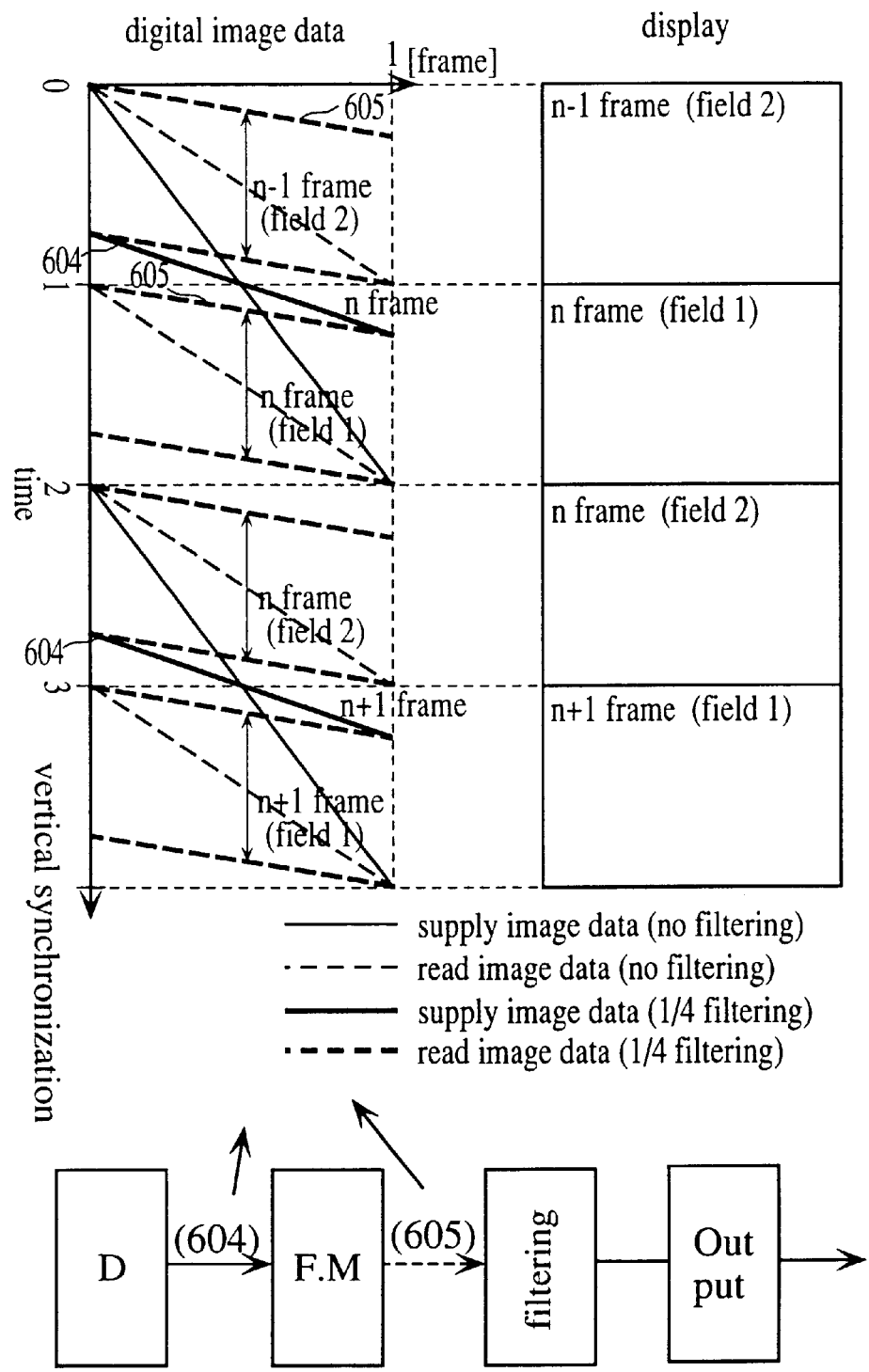
FIG. 23 is an explanatory diagram showing ¼ downscaling in the vertical direction according to a prior art.

In comparison to FIG. 20, FIG. 23 shows the amount of data supplied over time when ¼ downscaling is performed in a structure not including buffer memory 304.

A graph of the ¼ downscaling is shown in FIG. 23. For the same reasons given above, the capacity of media processor 200 to supply frame data from decoding unit 301 to frame memory 302 and from frame memory 302 to vertical filtering unit 303, and the capacity of vertical filtering unit 303 to perform operations each need to be four times that of when downscaling is not performed. Thus when buffer memory 304 is not provided, increases in the rate of downscaling lead to increases in the required capacity of media processor 200.

3.1.2 ¼ Downscaling

Figure 22:
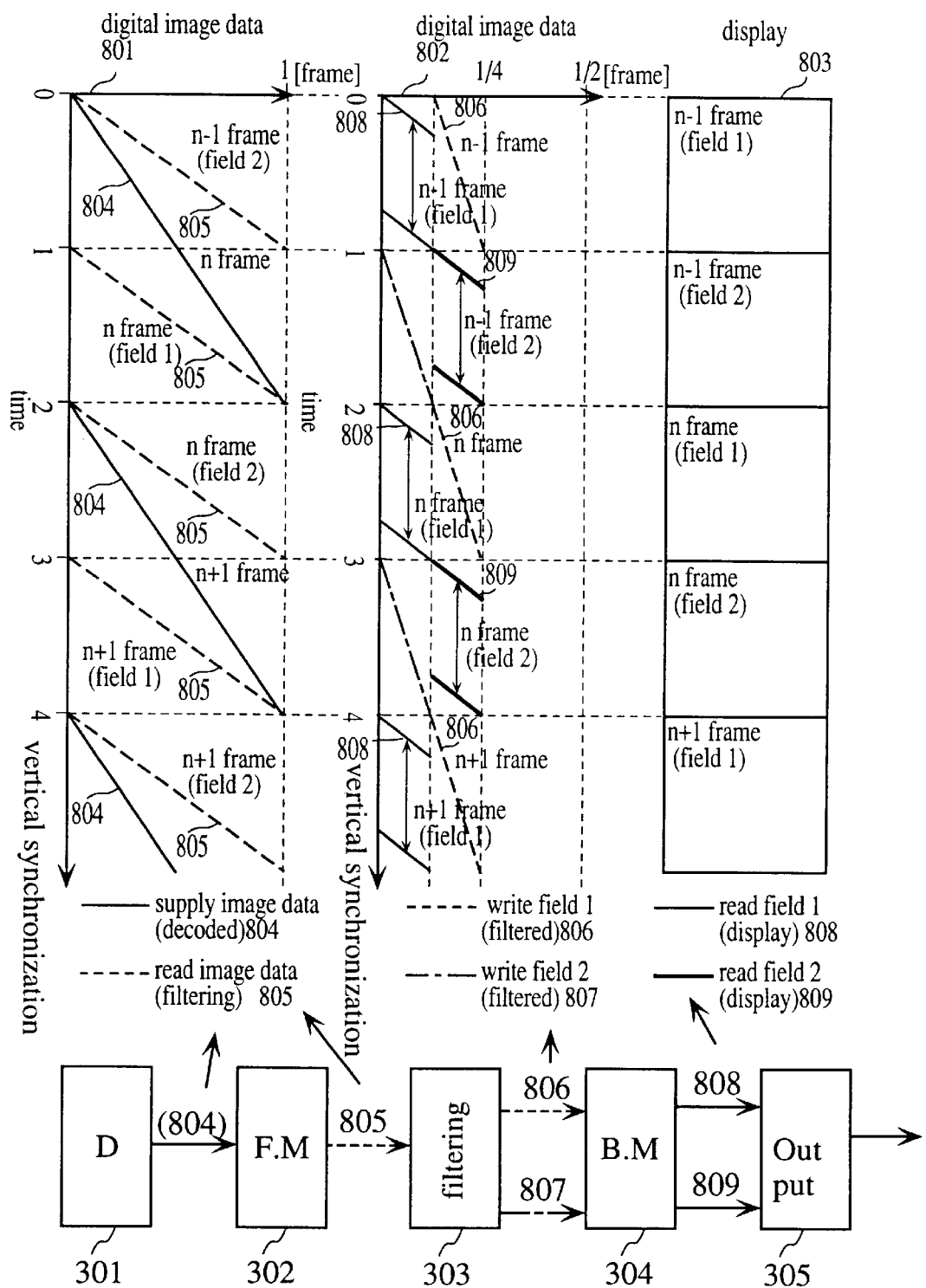
FIG. 22 shows in detail ¼ downscaling in the vertical direction.

FIG. 22 shows the amount of data supplied over time when ¼ downscaling is performed in the media processor shown in FIG. 19.

The vertical and horizontal axes in FIG. 22 are the same as those in FIG. 20. In graph 801, lines 804 show the supply of frame data from decoding unit 301 to frame memory 302, and lines 805 shows the supply of frame data from frame memory 302 to vertical filtering unit 303.

In graph 802, lines 806 and 807 show the supply of ¼ downscaled image data (fields 1 and 2, respectively) from vertical filtering unit 303 to buffer memory 304, and lines 808 and 809 show the supply of ¼ downscaled image data (fields l and 2, respectively) from buffer memory 304 to image output unit 305.

As shown in FIG. 22, media processor 200 is required to have the capacity to supply one frame of frame data from decoding unit 301 to frame memory 302 in a 2V period, ½ frame from frame memory 302 to vertical filtering unit 303 in 1V, ⅛ frame from vertical filtering unit 303 to buffer memory 304 in 1V, and ⅛ frame from buffer memory 304 to image output unit 305 in 1V. Decoding unit 301 is required to have the capacity to decode one frame in 2V, and vertical filtering unit 303 is required to have the capacity to filter ½ frame in 1V. It is sufficient if frame memory 302 and buffer memory 305 have the capacity to store 1 frame and ¼ frame, respectively.

In the above construction, the minimum required processing period is 1V, and higher performance levels are not required even at increased rates of downscaling.

The maximum performance level required of media processor 200 is when downscaling is not performed. In this case, media processor 200 is required to have the capacity to supply one frame of frame data from decoding unit 301 to frame memory 302 in a 2V period, ½ frame from frame memory 302 to vertical processing unit 303 in 1V, ½ frame from vertical filtering unit 303 to buffer memory 304 in 1V, and ½ frame from buffer memory 304 to image output unit 305 in 1V. Decoding unit 301 is required to have the capacity to decode one frame of frame data in 2V, and vertical filtering unit 303 is required to have the capacity to filter ½ frame in 1V. Frame memory 302 and 304 are each required to have the capacity to store one frame of frame data.

Any rate of vertical downscaling can be performed within this maximum performance level. Thus the above construction allows for reductions in both the size of the filtering circuitry and in the number of clock cycles required to complete the vertical filtering.

3.2 Vertical Filtering (2)

Figure 24:
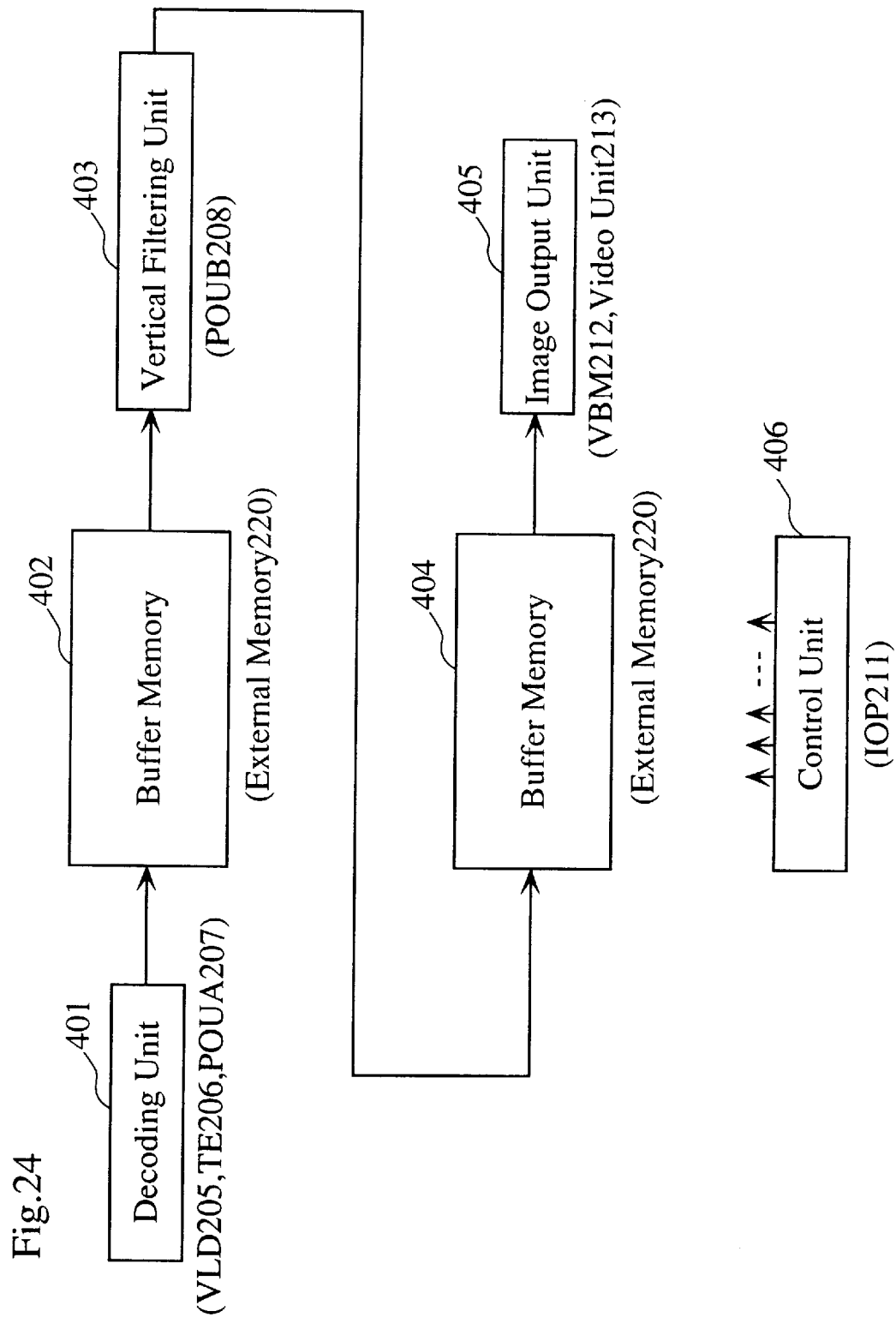
FIG. 24 is a simplified block diagram showing a further flow of data when vertical filtering is performed in the media processor.

FIG. 24 is a block diagram showing in simplified form the data flow when vertical filtering is performed in media processor 200.

Media processor 200 in FIG. 24 includes a decoding unit 401, a buffer memory 402, a vertical filtering unit 403, a buffer memory 404, an image output unit 405, and a control unit 406. Since all of these elements except for buffer memory 402 and control unit 406 are included in FIG. 19, the following description focuses on the difference between the two structures.

Buffer memory 402 differs from frame memory 302 in FIG. 19 in that it only requires the capacity to store less than one frame of frame data.

Vertical filtering unit 403 differs from vertical filtering unit 303 in that it sends notification of the state of progress of the vertical filtering to control unit 406 after every 64 lines (i.e. after every 4 macroblock lines, 1 macroblock line consisting of 16 lines of pixel data) of filtering that is completed. It is also possible for notification to be sent after every two to three macroblock lines (i.e. after every 32 or 48 lines of pixel data).

Decoding unit 401 differs from decoding unit 301 in that it sends notification of the state of progress of the decoding to control unit 406 after every 64 lines of decoding that is completed. It is also possible for the notification to be sent after every 16 lines (i.e. after every 1 macroblock line).

Control unit 406 is the equivalent of IOP 211 in FIG. 2. Control unit 406 monitors the state of the decoding and filtering of decoding unit 401 and vertical filtering unit 403, respectively, based on the notifications sent from both of these elements, and controls decoding unit 401 and vertical filtering unit 403 so that overrun and underrun do not occur in relation to the decoding and the vertical filtering. In short, control unit 406 performs the following two controls: firstly, control unit 406 prevents vertical filtering unit 403 from processing the pixel data of n–1 frame (or field 2 or 1 of n–1 or n frame, respectively) when decoding unit 401 has yet to write the pixel data of n frame (or field 1 or 2 of n frame, respectively) into buffer memory 402; and secondly, control unit 406 prevents decoding unit 401 from overwriting the pixel data of unprocessed microblock lines stored in buffer memory 402 with pixel data from the following frame (or field)

Figure 25:
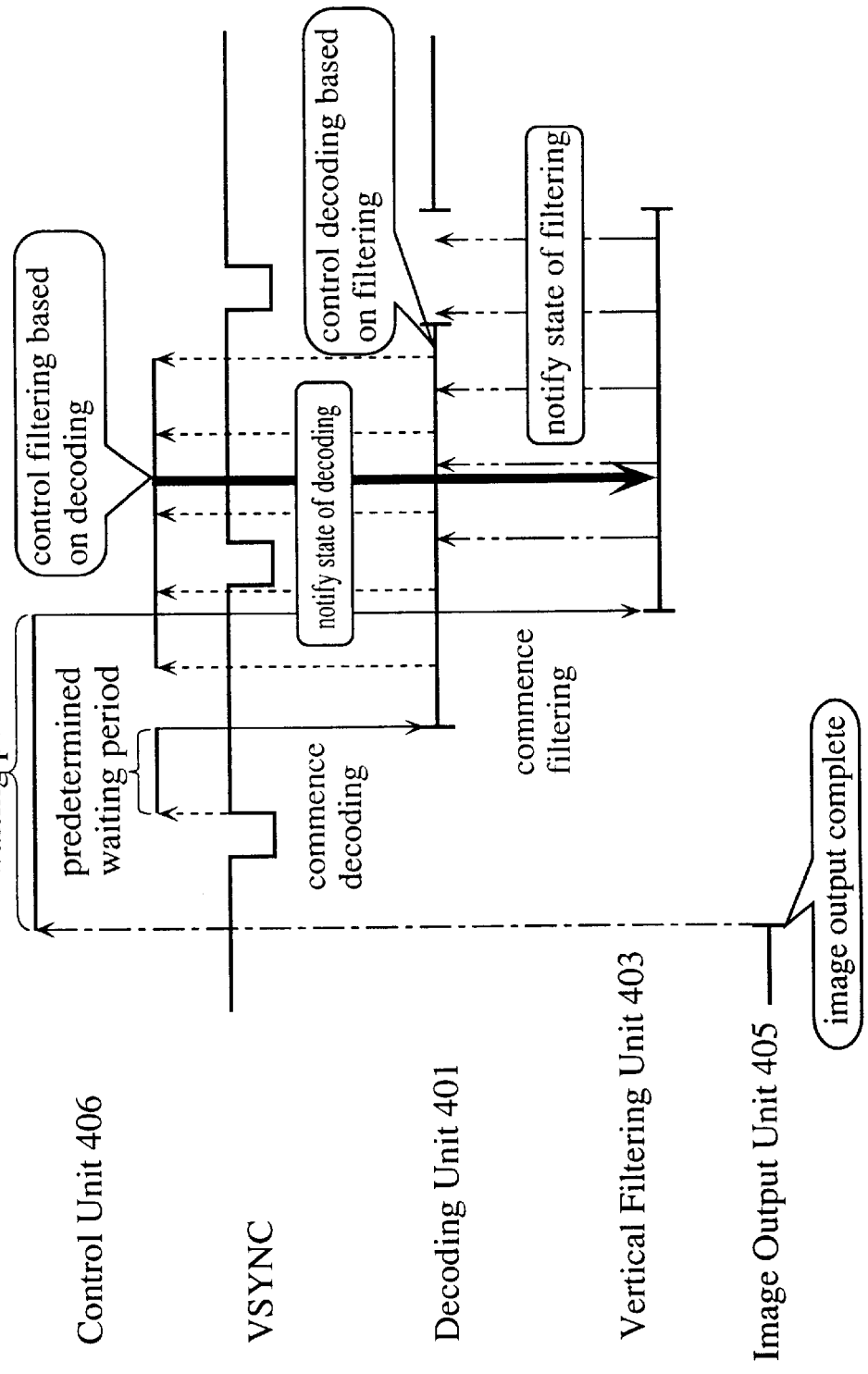
FIG. 25 shows in simplified form a timing of the decoding and the vertical filtering.

FIG. 25 shows in detail the controls performed by control unit 406.

In FIG. 25, the horizontal axis measures time and the vertical axis shows, respectively, control unit 406, the VSYNC, decoding unit 401, vertical processing unit 403, and image output unit 405.

As shown in FIG. 25, decoding unit 401 notifies control unit 406 of the state of the decoding after every 64 lines of decoding that is completed, and vertical processing unit 403 notifies control unit 406 of the state of the filtering after every 64 lines of filtering that is completed. Control unit 406 stores and updates the line number Nd of the lines as they are decoded and the line number Nf of the lines as they are filtered, and controls decoding unit 401 and vertical filtering unit 406 such that Nd (n frame)>Nf (n frame) and Nd (n+1 frame)<Nf (n frame). Specifically, control unit 406 suspends the operation of either decoding unit 401 or vertical filtering unit 403 when Nd and Nf approach one another (i.e. the difference between Nd and Nf falls below a predetermined threshold). Also, it is possible to calculate Nd and Nf in terms of macroblock lines rather that pixel lines.

Although in the above description it is control unit 406 that suspend the operation of either decoding unit 401 or vertical filtering unit 403 when the difference between Nd and Nf falls below the predetermined threshold, it possible for an element other than control unit 406 to perform the control.

For example, it is possible for vertical filtering unit 403 to notify decoding unit 401 directly of the state of the filtering. In this case, decoding unit 401 judges whether the difference between Nd and Nf falls below the predetermined threshold based on a comparison of the state of the filtering as per the notification and the state of the decoding. Depending of the result of the judging, decoding unit 401 can then suspend either the decoding or the operation of vertical filtering unit 403.

It is also possible for decoding unit 401 to notify vertical filtering unit 403 directly as to the state of the decoding. In this case, vertical filtering unit 403 judges whether the difference between Nd and Nf falls below the predetermined threshold based on a comparison of the state of the decoding as per the notification and the state of the filtering. Depending of the result of the judging, vertical filtering unit 403 can then suspend either the filtering or the operation of decoding unit 401.

3.2.1 ½ Downscaling

Figure 26:
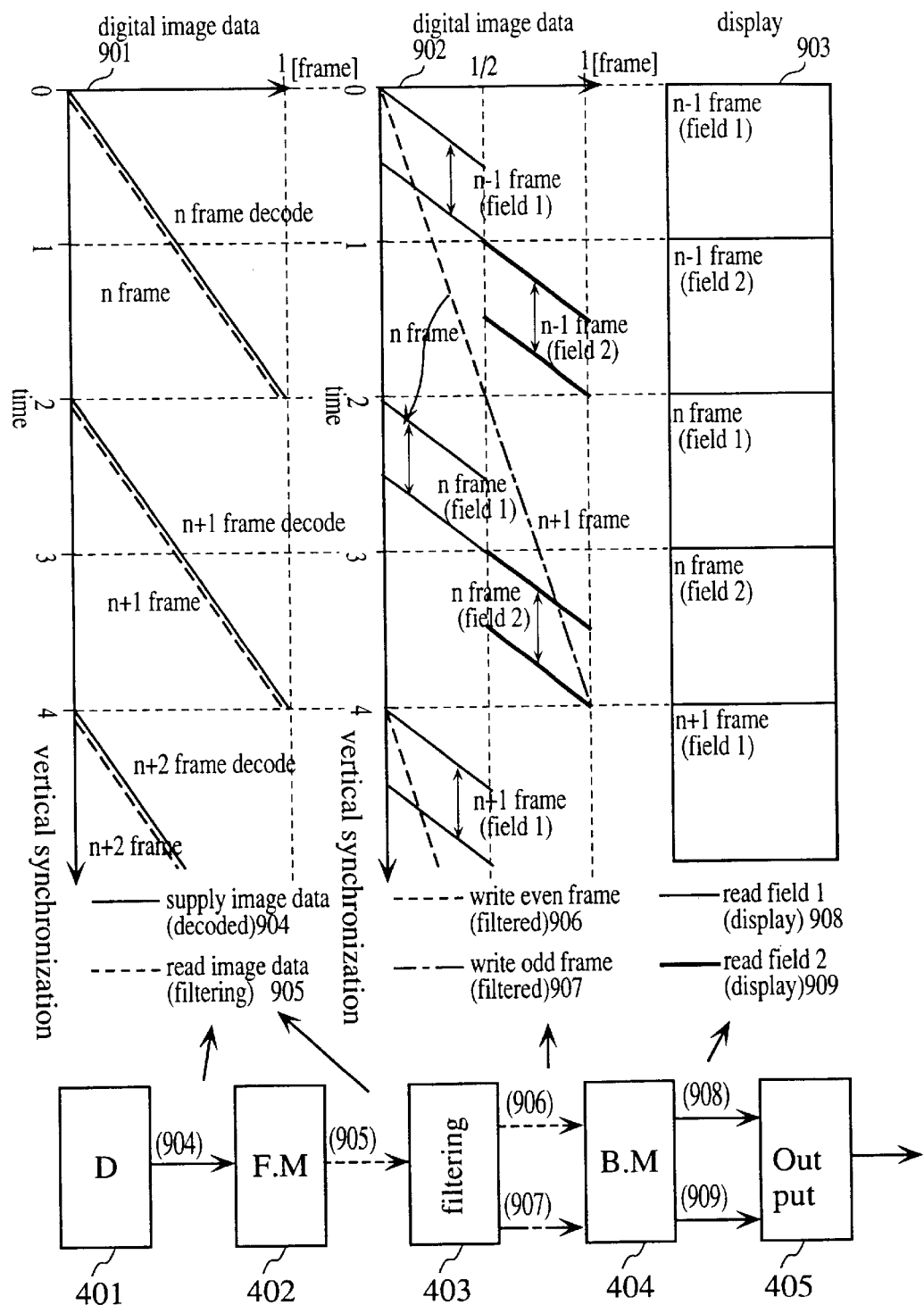
FIG. 26 shows in detail ½ downscaling in the vertical direction.

FIG. 26 shows the amount of data supplied over time to buffer memory 402 and 404 when ½ downscaling is performed in media processor 200.

The horizontal axis of graphs 901 and 902 measure the supply of frame data to buffer memory 402 and 404, respectively. Graph 903 shows a state of image output unit 405 in time series. The vertical axes of all three graphs measure time and are identical.

In graph 901, lines 904 shows the supply of frame data from decoding unit 401 to buffer memory 402, and lines 905 shows the supply of frame data from buffer memory 402 to vertical filtering unit 403.

In graph 902, lines 906 and 907 show the supply of the downscaled image (field 1 and 2, respectively) from vertical filtering unit 403 to buffer memory 404, and lines 908 and 909 show the supply of the downscaled image (field 1 and 2, respectively) from buffer memory 404 to image output unit 405.

As shown in graph 901, the supply of n frame from buffer memory 402 to vertical filtering unit 403 (line 905) is controlled to both commence and be complete immediately after the supply of n frame from decoding unit 401 to buffer memory 402 (line 904) has commenced and been completed, respectively.

As shown in graph 902, the supply of n frame from vertical filtering unit 403 to buffer memory 404 (lines 906 and 907) is controlled to be complete during the display period of n−1 frame (lines 908 and 909).

By performing the controls described above, media processor 200 requires the capacity to supply one frame of frame data from decoding unit 401 to buffer memory 402 in a 2V period, one frame from buffer memory 402 to vertical filtering unit 403 in 2V, ½ frame from vertical filtering unit 403 to buffer memory 404 in 2V, and ¼ frame from buffer memory 404 to image output unit 405 in 1V. Decoding unit 401 requires the capacity to decode one frame in 2V, and vertical filtering unit 403 requires the capacity to filter one frame in 2V. Buffer memory 402 and 404 require the capacity to store several lines and one frame of frame data, respectively.

3.2.2 ¼ Downscaling

Figure 27:
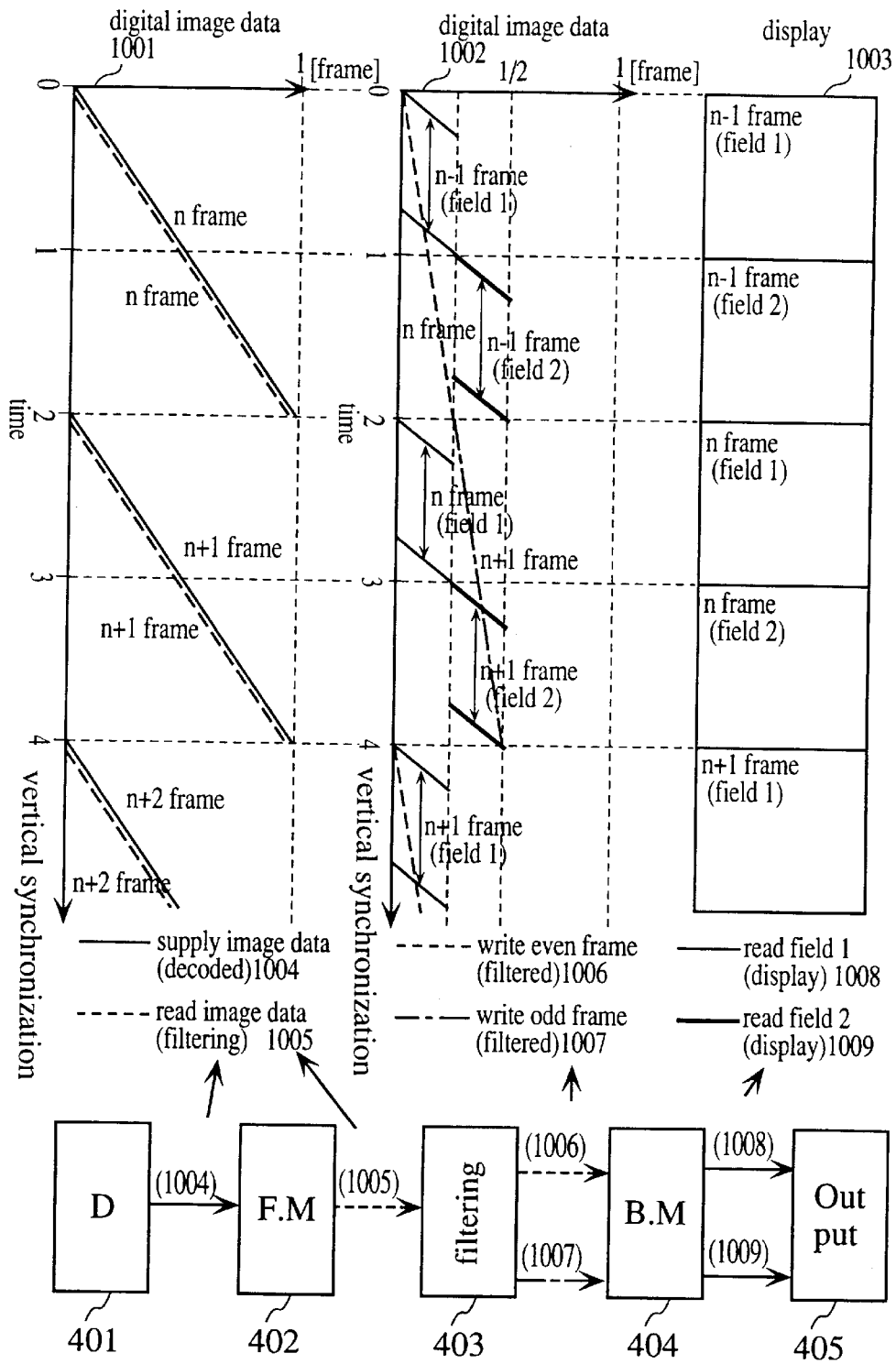
FIG. 27 shows in detail ¼ downscaling in the vertical direction.

FIG. 27 shows the amount of data supplied over time to buffer memory 402 and buffer memory 404 when ¼ downscaling is performed according to the flow of data shown in FIG. 24.

The horizontal axes of graphs 1001 and 1002 show the amount of frame data supplied to buffer memory 402 and buffer memory 404, respectively. Graph 1003 shows a state of image output unit 405 in time series. The vertical axes of all three graphs measure time and are identical.

In graph 1001, lines 1004 show the supply of frame data from decoding unit 401 to buffer memory 402, and lines 1005 show the supply of frame data from buffer memory 402 to vertical filtering unit 403.

In graph 1002, lines 1006 and 1007 show the supply of a downscaled image (field 1 and 2, respectively) from vertical filtering unit 403 to buffer memory 404, and lines 1008 and 1009 show the supply of the downscaled image (field 1 and 2, respectively) from buffer memory 404 to image output unit 405.

By performing the above controls, media processor 200 is required to have the capacity to supply one frame of frame data from decoding unit 401 to buffer memory 402 (lines 1004) in a 2V period, one frame from buffer memory 402 to vertical filtering unit 403 (lines 1005) in 2V, ¼ frame from vertical filtering unit 403 to buffer memory 404 (lines 1006 and 1007) in 2V, and ⅛ frame from buffer memory 404 to image output memory 405 (lines 1008 and 1009) in 1V. Decoding unit 401 is required to have the capacity to decode one frame in 2V, and vertical filtering unit 403 is required to have the capacity to filter one frame in 2V. Buffer memory 402 is required to have the capacity to store several lines of frame data, and buffer memory 404 is required to have the capacity to store ½ frame of frame data.

In the above construction, the minimum required processing period is 1V, and higher performance levels are not required even at increased rates of downscaling.

The maximum performance level required of media processor 200 is when downscaling is not performed. In this case media processor 200 is required to have the capacity to supply one frame of frame data from decoding unit 401 to buffer memory 402 in a 2V period, one frame from buffer memory 402 to vertical filtering unit 403 in 2V, one frame from vertical filtering unit 403 to buffer memory 404 in 2V, and ½ frame from buffer memory 404 to image output memory 405 in 1V. Decoding unit 401 is required to have the capacity to decode one frame in 2V, and vertical filtering unit 403 is required to have the capacity to filter one frame in 2V.

Buffer memory 402 is required to have the capacity to store several lines of frame data, and buffer memory 404 is required to have the capacity to store two frame of frame data.

Any rate of vertical downscaling can be performed within this maximum performance level. The above construction thus allows for reductions in both the size of the filtering circuitry and the number of clock cycles required to complete the vertical filtering.

4. Variations

Figure 28:
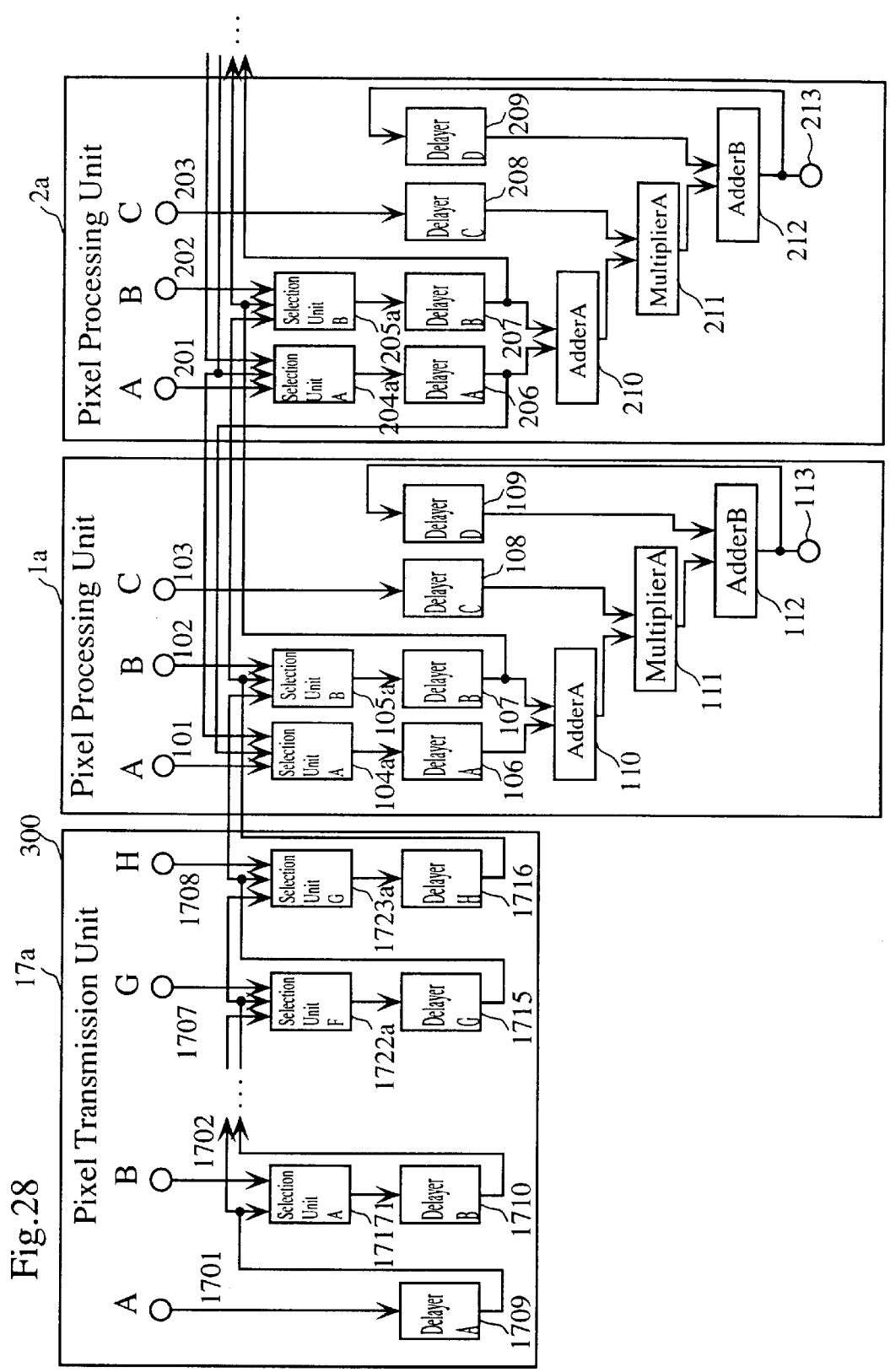
FIG. 28 shows a left-hand section of a first variation of the pixel parallel-processing unit.
Figure 29:
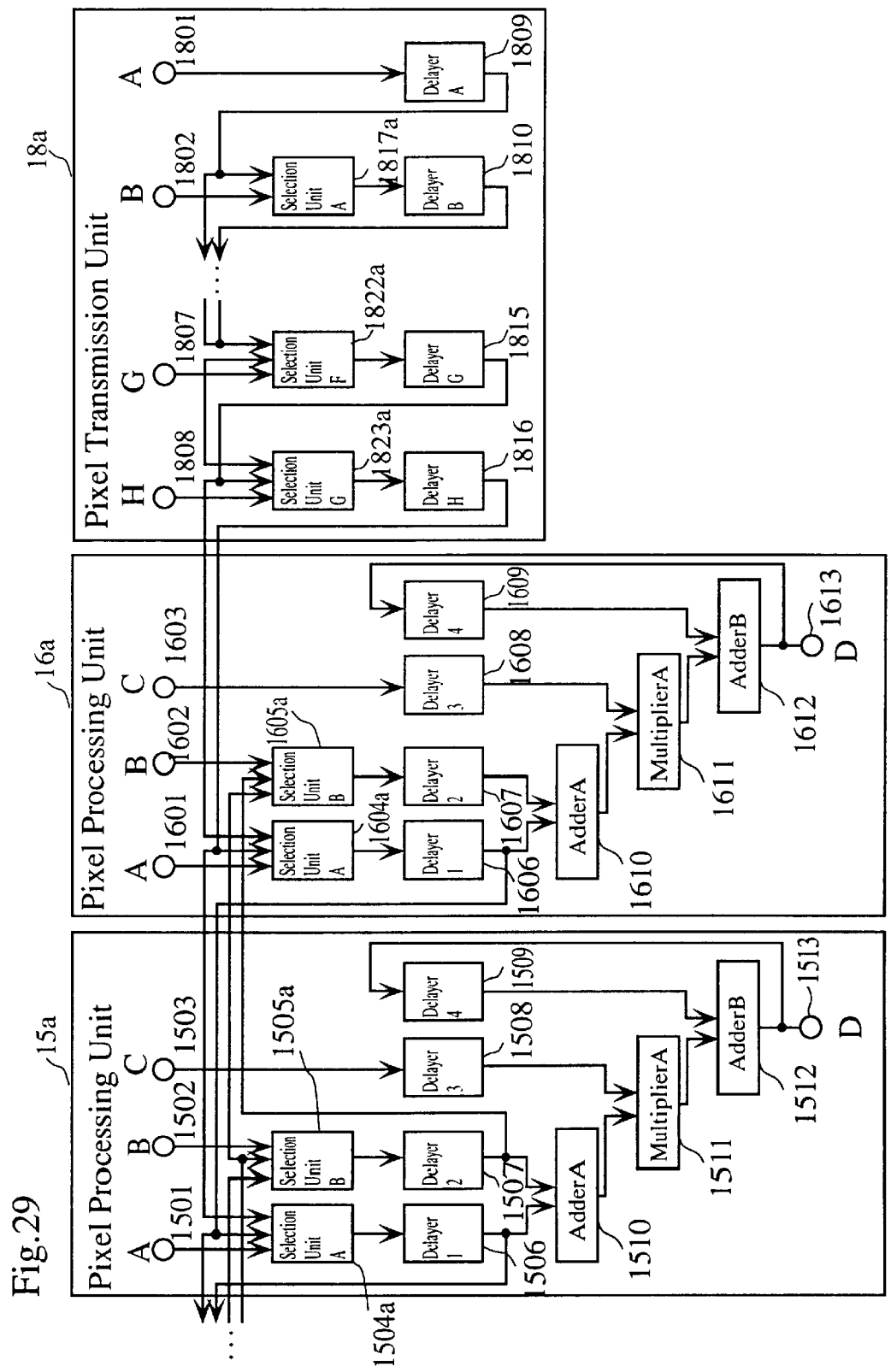
FIG. 29 shows a right-hand section of the first variation of the pixel parallel-processing unit.

FIGS. 28 and 29 show a left and right section, respectively, of a variation 1 of pixel parallel-processing unit 21. Given the similarities in structure and numbering of the elements with pixel-parallel processing unit 21 shown in FIGS. 3 and 4, the following description of variation 1 will focus on the differences between the two structures.

In FIGS. 28 and 29, pixel processing units 1a to 16a and pixel transmission units 17a and 18a replace pixel processing units 1 to 16 and pixel transmission units 17 and 18 in FIGS. 3 and 4.

Given the identical structures of pixel processing units 1a to 16a, the following description will refer to pixel processing unit 1a as an example.

In pixel processing unit 1a, selection units A104a and B105a replace selection units A104 and B105 in pixel processing unit 1.

Selection unit A104a differs from selection unit A104 in that the number of inputs has increased from two to three. In other words, selection unit A104a receives input of pixel data from delayers (delayer B) in the two nearest pixel processing units (and/or pixel transmission unit) adjacent on the right of pixel processing unit 1a.

Likewise, selection unit B105a receives additional input of pixel data from delayers (delayer B) in the two nearest pixel processing units (and/or pixel transmission unit) adjacent on the left of pixel processing unit 1a.

In pixel transmission unit 17a, selection units B1703a to G1708a replace selection units B1703 to G1708 in pixel transmission unit 17. Selection units B1703a to G1708a differ from selection units B1703 to G1708 in that the number of inputs into each selection unit has increased from two to three. In other words, in pixel transmission unit 17a each respective selection unit receives input of pixel data from the two nearest delayers adjacent on the left.

Likewise, in pixel transmission unit 18a, selection units B1803a to G1808a replace selection units B1803 to G1808 in pixel transmission unit 18. Selection units B1803a to G1808a differ from selection units B1803 to G1808 in that the number of inputs into each selection unit has increased from two to three. In other words, in pixel transmission unit 18a -each respective selection unit receives input of pixel data from the two nearest delayers adjacent on the right.

Thus in variation 1, the filtering is performed using the two pixels adjacent on both the left and right of the target pixel. For example, the output of pixel processing unit 1a is: $a0*X9+a1(X11+X7)+a2(X13+X5)+a3(X15+X3)$ FIGS. 30 and 31 show a left and right section, respectively, of a variation 2 of pixel parallel-processing unit 21.

Figure 30:
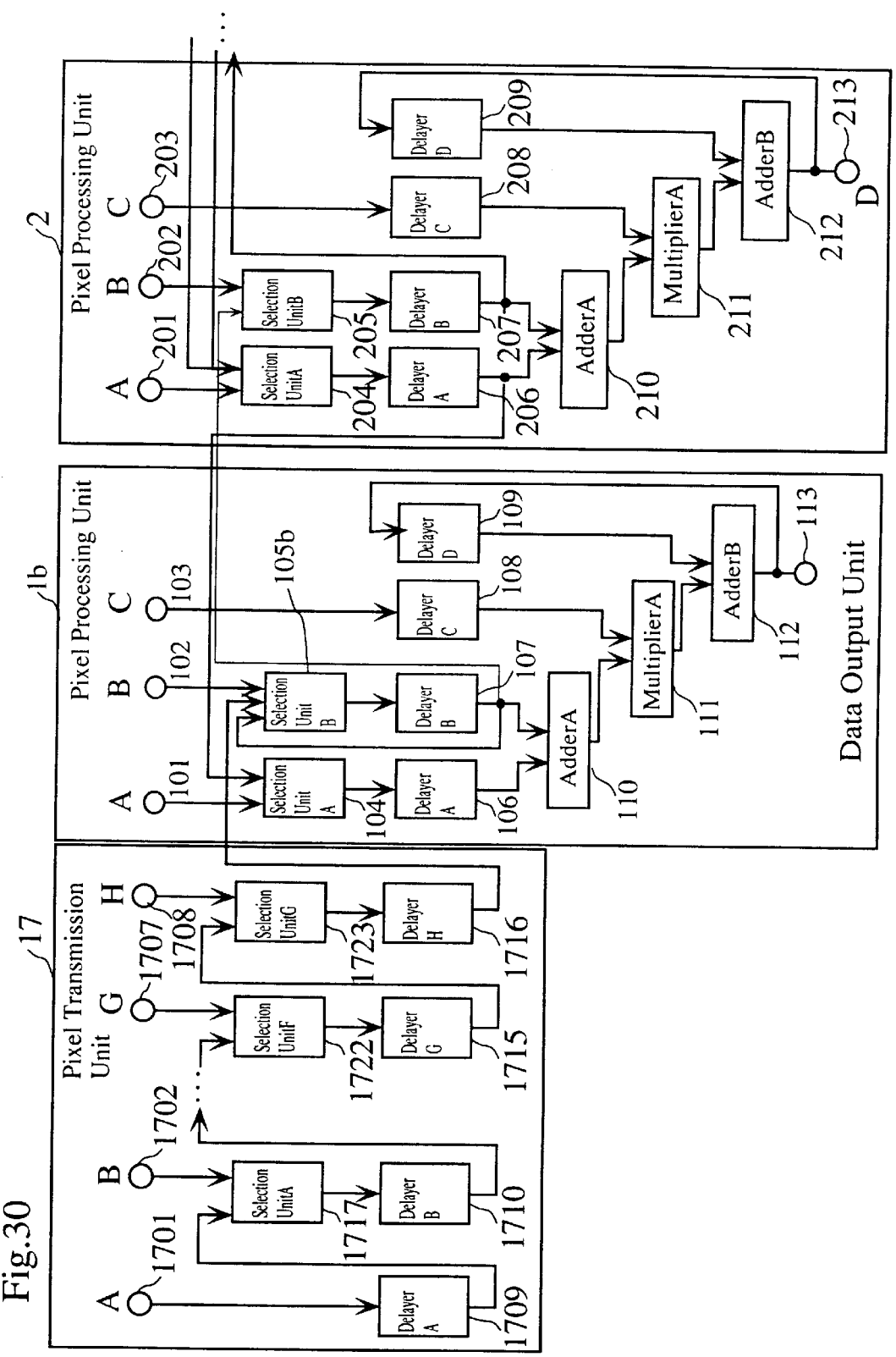
FIG. 30 shows a left-hand section of a second variation of the pixel parallel-processing unit.
Figure 31:
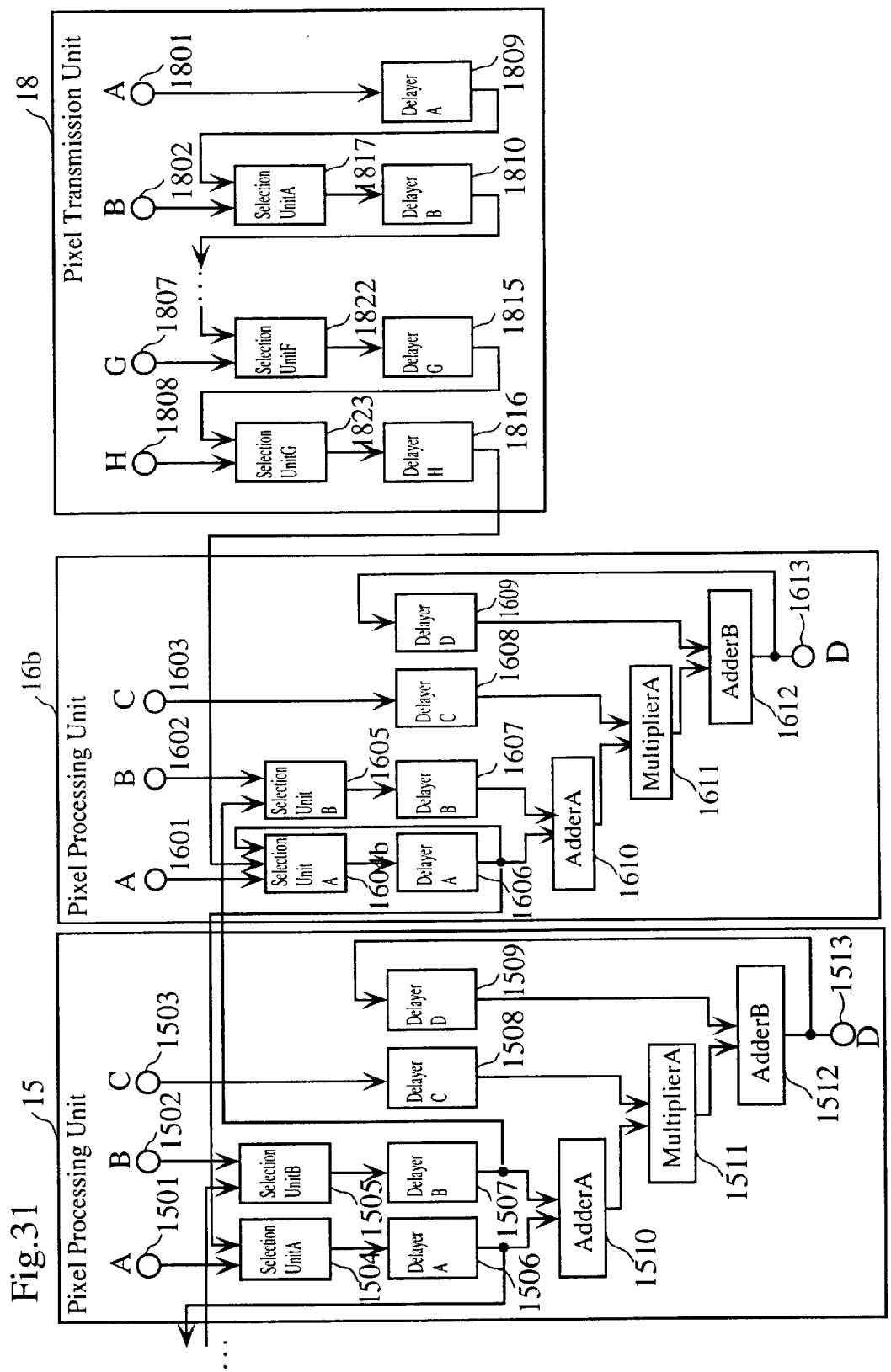
FIG. 31 shows a right-hand section of the second variation of the pixel parallel-processing unit.

In FIGS. 30 and 31, pixel processing units 1a and 16a replace pixel processing units 1 and 16 in FIGS. 3 and 4.

In pixel processing unit 1b, selection unit B105b replaces selection unit B105 in pixel processing unit 1. Selection unit B105b differs from selection unit B105 in that it receives a feedback input from delayer B107.

In pixel processing unit 16b, selection unit A1604b replaces selection unit 1604 in pixel processing unit 16. Selection unit A1604b differs from selection unit A1604 in that it receives a feedback input from delayer A1606.

In variation 2, the output of pixel processing unit 1b is: $a3*X6+a2*X7+a1*X8+a0*X9+a1*X10+a2*X11+a3*X12$ The output of pixel processing unit 2 is: $a3*X20+a2*X21+a1*X22+a0*X23+a1*X24+a2*X24+a3*X24$ And the output of pixel processing unit 16b is: $a3*X21+a2*X22+a1*X23+a0*X24+a1*X24+a2*X24+a3*X24$ Thus in pixel processing unit 1b shown in FIG. 30, selection unit B105b selects the feedback input from delayer B whenever the supplied pixel data is from the delayers in pixel transmission unit 17 adjacent on the left.

Likewise, in pixel processing unit 16b as shown in FIG. 31, selection unit A1604b selects the feedback input from delayer A1606 whenever the supplied pixel data is from the delayers in pixel transmission unit 18 adjacent on the right.

Figure 32:
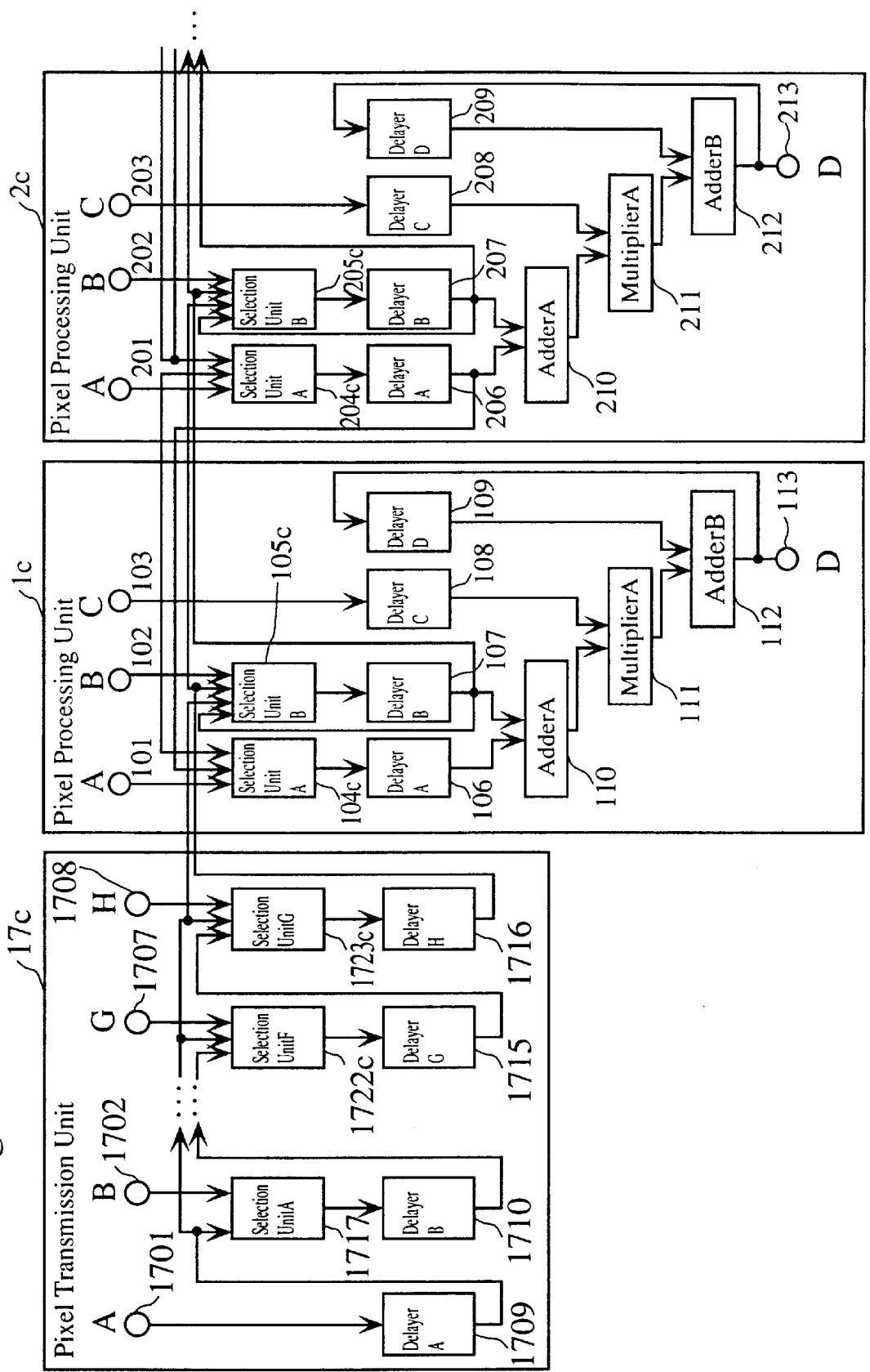
FIG. 32 shows a left-hand section of a third variation of the pixel parallel-processing unit.
Figure 33:
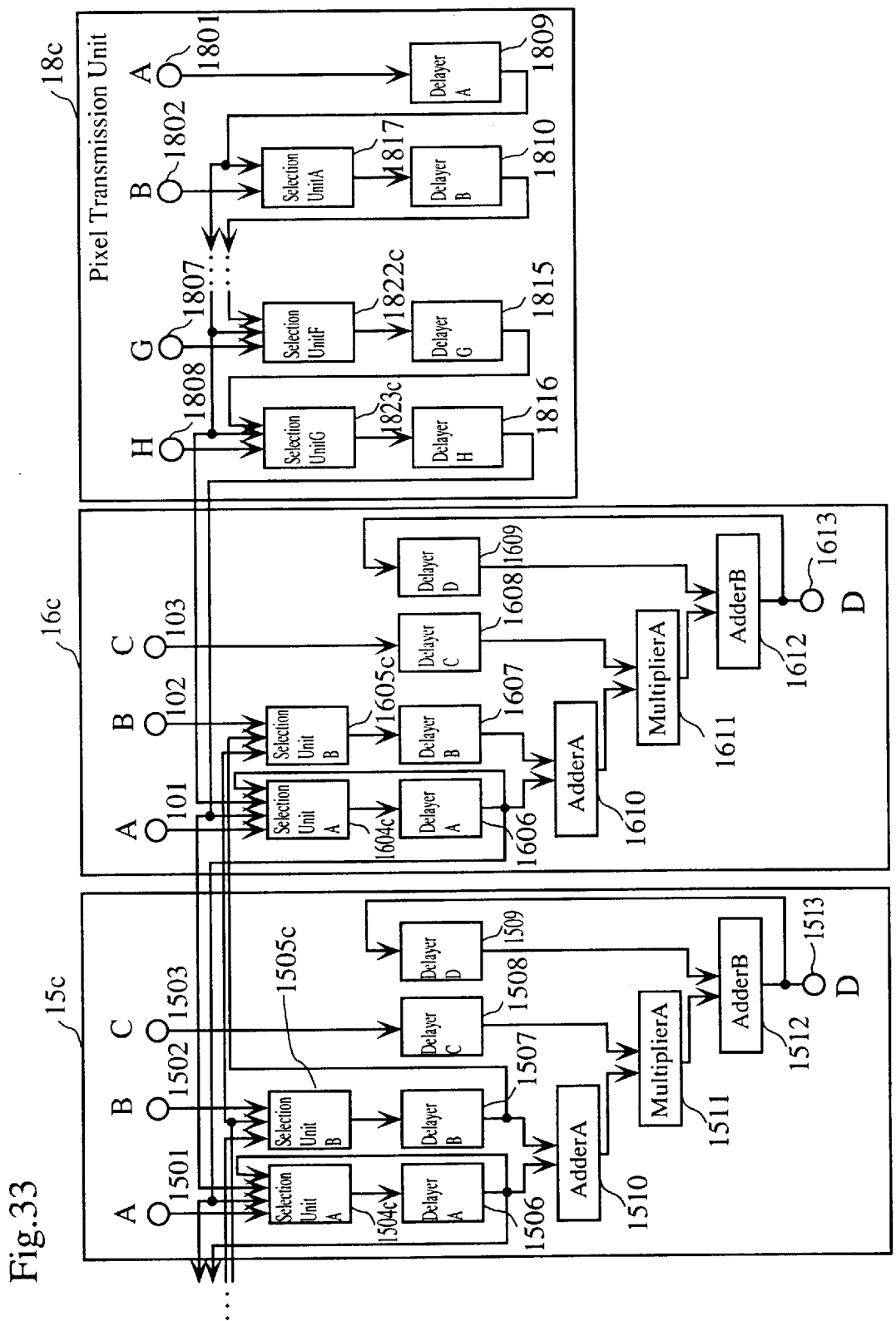
FIG. 33 shows a right-hand section of the third variation of the pixel parallel-processing unit.

FIGS. 32 and 33 show a left and right section, respectively, of a variation 2 of pixel parallel-processing unit 21.

In FIGS. 32 and 33, pixel processing units 1c to 16c and pixel transmission units 17c and 18c replace pixel processing units 1 to 16 and pixel transmission units 17 and 18 in FIGS. 3 and 4.

In pixel processing unit 1c, selection units A104c and B105c replace selection units A104 and B105 in pixel processing unit 1.

Selection unit A104c differs from selection unit A104 in that the number of inputs has increased from two to three. In other words, selection unit A104c receives input of pixel data from delayers (delayer B) in the two nearest pixel processing units (and/or pixel transmission unit) adjacent on the right of pixel processing unit 1c.

Likewise, selection unit B105c receives additional input of pixel data from delayers (delayer B) in the two nearest pixel processing units (and/or pixel transmission unit) adjacent on the left of pixel processing unit 1c.

As with the selection units in pixel transmission units 17a and 18a shown in FIGS. 28 and 29, the number of inputs into each of selection units C1718c to G1723c and C1818c to G1823c, respectively, is three rather than two.

In the above structure, the output of pixel processing unit 1c is: $a3*X9+a2*X9+a1*X9+a0*X9+a1*X11+a2*X13+a3*X15$ The output of pixel processing unit 2c is:
$a3*X10+a2*X10+a1*X10+a0*X10+a1*X12+a2*X14+a3*X16$ The output of pixel processing unit 15c is:
$a3*X17+a2*X19+a1*X21+a0*X23+a1*X23+a2*X23+a3*X23$ And the output of pixel processing unit 16c is:
$a3*X18+a2*X20+a1*X22+a0*X24+a1*X24+a2*X24+a3*X24$ FIG. 34 shows a variation of POUA 207.

Figure 34:
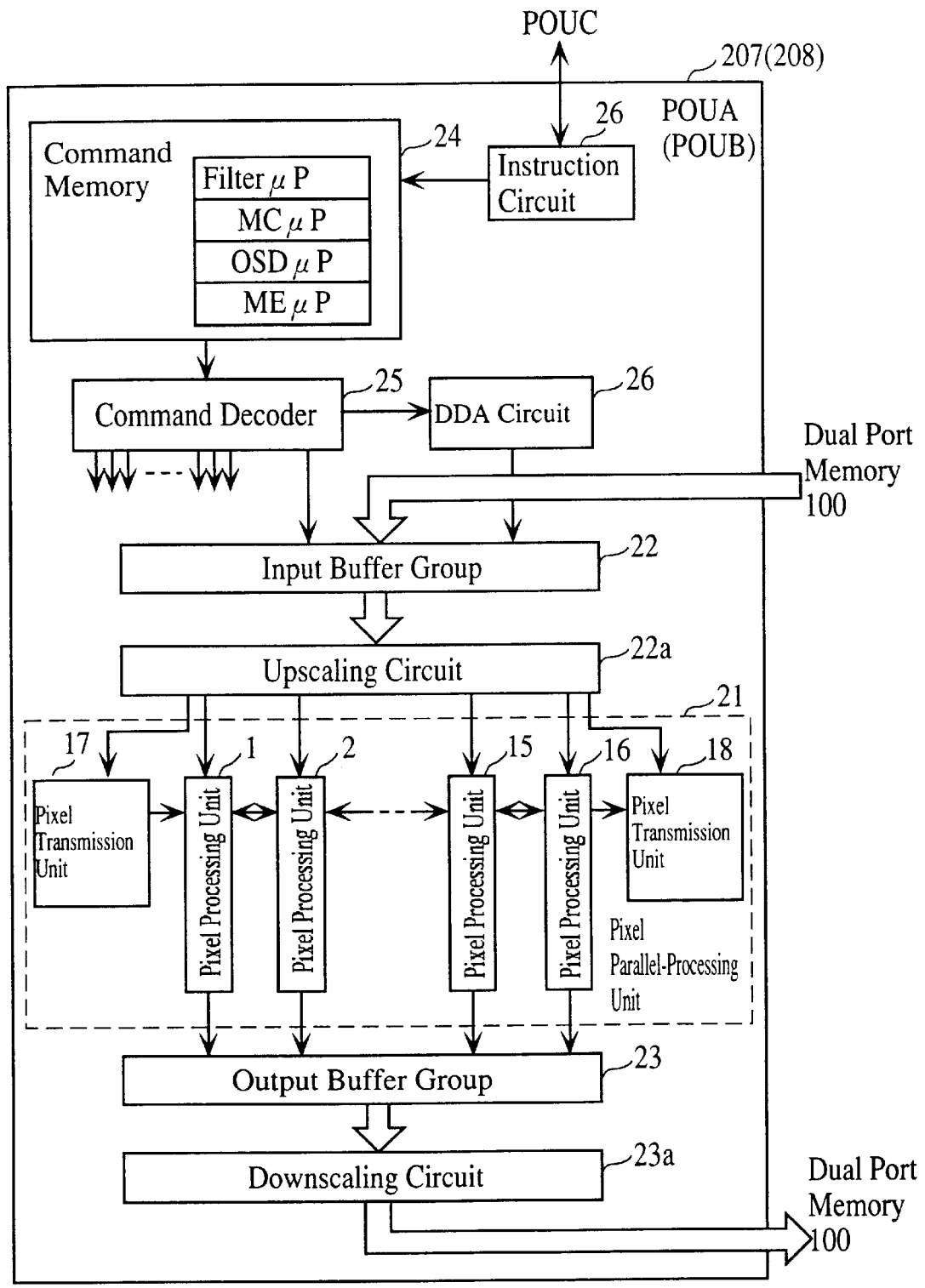
FIG. 34 shows a variation of the pixel operation unit.

In comparison to POUA 207 shown in FIG. 2, the variation shown in FIG. 34 additionally includes an upsampling circuit 22a and a downsampling circuit 23a. Given the similarities between FIG. 2 and FIG. 34, the description below focuses on the differences between the two structures.

Upsampling circuit 22a upscales in a vertical direction the pixel data inputted from input buffer group 22. In order to interpolate the inputted pixel data by a factor of two, for example, upsampling circuit 22a outputs each input of pixel data twice to pixel parallel-processing unit 21.

Downscaling circuit 23a downscales in a vertical direction the processed pixel data outputted from pixel parallel-processing unit 21. In order to decimate the processed pixel data by half, for example, downsampling circuit 22a decimates each input of pixel data by half. In other words, downscaling circuit 23a outputs only one of every two inputs from pixel parallel processing unit 21.

In the above structure, it is possible to reduce the per frame amount of pixel data stored in external memory 220 by half in the vertical direction, according to the given example, as a result of the input of pixel data into and the output of pixel data from pixel parallel processing unit 21 being interpolated or decimated by a factor of 2 or 0.5, respectively, in the vertical direction. Thus the amount of pixel data required to be sent to POUA 207 by POUA 209 is reduced by half, and as a result bottlenecks occurring when access is concentrated in the internal port of dual port memory 100 can be avoided.

INDUSTRIAL APPLICABILITY

The pixel calculating device of the present invention, which performs sequential filtering on a plurality of pixels in order to resize, etc, an image, is applicable in a media processor of similar digital imaging equipment that manages moving images which have been scaled, resized, and the like.

What is claimed is:

1. A pixel calculating device that conducts filtering, comprising:

N number of pixel processing means;

supply means for supplying n pieces of pixel data and filter coefficients; and control means for controlling the n pixel processing means in parallel, wherein each of the pixel processing means performs operations using the pixel data and filter coefficient supplied from the supply means, and then acquires pixel data from an adjacent pixel processing means, performs further operations using the acquired pixel data, and accumulates operation results, and the control means controls each of the pixel processing means to repeat the operations of acquiring the pixel data from the adjacent pixel processing means, performing operations using the acquired pixel data, and accumulating the operation results.

2. The pixel calculating device of claim 1, wherein the N pixel processing means form a first shifter that shifts N pieces of pixel data to the right, and a second shifter that shifts N pieces of pixel data to the left, and each of the pixel processing means performs the operations using two pieces of pixel data shifted from two adjacent pixel processing means.

3. A pixel calculating device comprising:

N number of pixel processing units corresponding respectively to N contiguous pieces of pixel data;

first supply means for supplying the N pieces of pixel data to the N pixel processing units;

second supply means for supplying filter coefficients to the N pixel processing units; and means for designating a number of taps required to perform filtering, wherein each of the pixel processing units includes acquiring means for acquiring pixel data from another pixel processing unit;

operation means for performing operations using the pixel data and the filter coefficient supplied from the second supply means;

accumulating means for accumulating operation results outputted from the operation means; and control means for controlling the operation means to perform operations using the N pieces of pixel data supplied from the first supply means and the filter coefficient supplied from the second supply means, and then for controlling, in accordance with the designated number of taps, (i) the operation means to repeatedly perform operations using the acquired pixel data and filter coefficient and (ii) the accumulating means to repeatedly accumulate the operation results.

4. A pixel calculating device comprising:

a plurality of pixel processing units corresponding respectively to a plurality of contiguous pieces of pixel data;

first supply means for supplying the plurality of pixel data to the plurality of pixel processing units; and second supply means for supplying a filter coefficient to each of the pixel processing units, wherein each of the pixel processing units includes acquiring means for acquiring pixel data from another pixel processing unit;

operation means for performing operations using the pixel data and the filter coefficient supplied from the second supply means;

accumulating means for accumulating operation results outputted from the operation means; and control means for (i) controlling the acquiring means, the operation means, and the accumulating means to perform filtering, and for (ii) controlling, when both a plurality of pixel data from a decoding target frame and a plurality of differential pixel data corresponding to the pixel data of the decoding target frame is supplied from the first supply means, the operation means to switch from performing the filtering to performing motion compensation processing.

5. A pixel calculating circuit comprising:

a plurality of pixel processing means corresponding respectively to a plurality of pixel data; and supply means for supplying the plurality of pixel data to the pixel processing means, wherein each of the pixel processing means includes a pixel selector for selecting pixel data supplied from the supply means and pixel data outputted from a first pixel processing means;

a storage circuit for storing the selected pixel data and outputting the selected pixel data to a second pixel processing means; and a operation circuit for performing operations using the stored pixel data.

\* \* \* \* \*